US009921638B2

(12) United States Patent
Haraguchi et al.

(10) Patent No.: US 9,921,638 B2
(45) Date of Patent: Mar. 20, 2018

(54) DATA PROCESSING SYSTEM WITH SELECTIVE ENGAGEMENT OF STANDBY MODE BASED ON COMPARISON WITH A BREAK-EVEN TIME

(71) Applicant: Renesas Electronics Corporation, Kanagawa (JP)

(72) Inventors: Masaru Haraguchi, Kanagawa (JP); Isamu Hayashi, Kanagawa (JP); Hiroyuki Kawai, Kanagawa (JP); Hideyuki Noda, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 446 days.

(21) Appl. No.: 14/500,246

(22) Filed: Sep. 29, 2014

(65) Prior Publication Data

US 2015/0095672 A1    Apr. 2, 2015

(30) Foreign Application Priority Data

Sep. 30, 2013  (JP) ................................. 2013-204651

(51) Int. Cl.
G06F 1/32 (2006.01)
G06F 9/48 (2006.01)

(52) U.S. Cl.
CPC ............ G06F 1/329 (2013.01); G06F 9/4893 (2013.01); *G06F 2209/485* (2013.01); *Y02B 60/144* (2013.01); *Y02B 60/32* (2013.01)

(58) Field of Classification Search
CPC .. G06F 1/329; G06F 9/4893; G06F 2209/485; Y02B 60/144; Y02B 60/32

(Continued)

(56) References Cited

U.S. PATENT DOCUMENTS

2003/0105983 A1*  6/2003  Brakmo .............. G06F 1/3203
                                                    713/320
2008/0162965 A1*  7/2008  Marinas .................. G06F 1/32
                                                    713/320

(Continued)

FOREIGN PATENT DOCUMENTS

JP    2009-175971 A    8/2009
JP    2011-100338 A    5/2011

OTHER PUBLICATIONS

T. Hattori, et.al., "Hierarchical Power Distribution and Power Management Scheme for a Single Chip Mobile Processor", Proc. of DAC, pp. 292-295, 2006.

(Continued)

*Primary Examiner* — Ji H Bae
(74) *Attorney, Agent, or Firm* — McDermott Will & Emery LLP

(57) ABSTRACT

The data processing system has: a plurality of hardware resources each having at least one standby mode; a control part for controlling execution of a task achieved by using, of the plurality of hardware resources, predetermined ones, and a working status of each hardware resource; and a power-source part for controlling supply of a power source to each hardware resource. The control part performs the scheduling of a scheduled execution time of the task based on information for determining a timing of executing the task, and calculates a standby time of the hardware resource based on a result of the scheduling. The control part compares the standby time with a break-even time depending on the standby mode, thereby deciding whether or not to cause each hardware resource to transition to the standby mode.

10 Claims, 21 Drawing Sheets

(58) Field of Classification Search
USPC .................... 713/320, 323; 718/100, 102
See application file for complete search history.

(56) References Cited

U.S. PATENT DOCUMENTS

| | | | |
|---|---|---|---|
| 2009/0031156 A1* | 1/2009 | Barth | G06F 1/3203 713/323 |
| 2009/0187261 A1 | 7/2009 | Otsuka et al. | |
| 2010/0251256 A1* | 9/2010 | Soules | G06F 9/4881 718/105 |
| 2010/0332876 A1* | 12/2010 | Fields, Jr. | G06F 1/3203 713/323 |
| 2011/0154080 A1* | 6/2011 | Wang | G06F 1/3228 713/323 |
| 2012/0216208 A1 | 8/2012 | Takemura et al. | |
| 2014/0258749 A1* | 9/2014 | Wamg | G06F 1/3287 713/320 |
| 2014/0289546 A1* | 9/2014 | Min | G06F 1/3228 713/323 |
| 2015/0067357 A1* | 3/2015 | Arora | G06F 1/3206 713/300 |
| 2015/0355942 A1* | 12/2015 | Colin | G06F 1/329 718/103 |

OTHER PUBLICATIONS

D.Ikebuchi and et.al., Geyser-1: A MIPS R3000 CPU Core with Fine Grain Runtime Power Gating, IEEE Asian Solid State Circuits Conference Nov. 16-18, 2009, Taipei, Taiwan.

C. Usami, et. al., "Temperature-dependent model for break-even time in tine-grain power gating and adaptive control based on the temperature dependence", The Institute of Electronics, Information and Communication Engineers (IEICE) Technical Report, VLD, VLDI Design Technologies, Japan, The Institute of Electronics, Information and communication Engineers (IEICE), May 12, 2010, vol. 110, No. 36, pp. 73-78.

Office Action dated Oct. 27, 2016, issued in corresponding Japanese Patent Application No. 2013-204651, with English language translation.

* cited by examiner

Fig.3A

| SENSOR PART 4_1 ||
|---|---|
| RANGE OF STANDBY TIME | ACTION MODE |
| Tw < Tbe4 | NON-STANDBY MODE (NORMAL ACTION MODE) |
| Tbe ≦ Tw | STANDBY MODE (WITH THE POWER SUPPLY CUT OFF) |

Fig.3B

| SENSOR PART 4_2 ||
|---|---|
| RANGE OF STANDBY TIME | ACTION MODE |
| Tw < Tbe5 | NON-STANDBY MODE (NORMAL ACTION MODE) |
| Tbe ≦ Tw | STANDBY MODE (WITH THE POWER SUPPLY CUT OFF) |

Fig.3C

| MCU ||
|---|---|
| RANGE OF STANDBY TIME | ACTION MODE |
| Tw < Tbe1 | NON-STANDBY MODE (NORMAL ACTION MODE) |
| Tbe1 ≦ Tw < Tbe2 | STANDBY MODE 1 (POWER SAVING EFFECT: SMALL) |
| Tbe2 ≦ Tw < Tbe3 | STANDBY MODE 2 (POWER SAVING EFFECT: MIDDLE) |
| Tbe3 ≦ Tw | STANDBY MODE 3 (WITH THE POWER SUPPLY CUT OFF, POWER SAVING EFFECT: LARGE) |

Fig.5

| TYPE OF TASK(TASK) | A | B |
|---|---|---|
| EXECUTION CYCLE OF TASK(Tc) | 50ms | 55ms |
| EXECUTION TIME OF TASK(Ton) | 1ms | 2ms |
| NUMBER OF REPETITION OF TASK EXECUTION(Rc) | ∞ | ∞ |
| HARDWARE RESOURCE TO BE USED(Rs) | 0 & 1 | 0 & 2 |

Fig.9A

Task A

| TASK ID | EXECUTION STATUS (Status) | SCHEDULED EXECUTION TIME (Scheduled time) | HARDWARE RESOURCES TO BE USED (Resource [2:0]) |
|---|---|---|---|
| A_1 | Ready | 0ms | 011 |
| A_2 | Wait | - | 011 |

Task B

| TASK ID | EXECUTION STATUS (Status) | SCHEDULED EXECUTION TIME (Scheduled time) | HARDWARE RESOURCES TO BE USED (Resource [2:0]) |
|---|---|---|---|
| B_1 | Ready | 0ms | 101 |
| B_2 | Wait | - | 101 |

Fig.9B

Task A

| TASK ID | EXECUTION STATUS (Status) | SCHEDULED EXECUTION TIME (Scheduled time) | HARDWARE RESOURCES TO BE USED (Resource [2:0]) |
|---|---|---|---|
| A_1 | Exe | 0ms | 011 |
| A_2 | Wait | 50ms | 011 |

Task B

| TASK ID | EXECUTION STATUS (Status) | SCHEDULED EXECUTION TIME (Scheduled time) | HARDWARE RESOURCES TO BE USED (Resource [2:0]) |
|---|---|---|---|
| B_1 | Ready | 1ms | 101 |
| B_2 | Wait | - | 101 |

Fig.9C

| Task A | | | |
|---|---|---|---|
| TASK ID | EXECUTION STATUS (Status) | SCHEDULED EXECUTION TIME (Scheduled time) | HARDWARE RESOURCES TO BE USED (Resource [2:0]) |
| A_3 | Wait | - | 011 |
| A_2 | Wait | 50ms | 011 |

| Task B | | | |
|---|---|---|---|
| TASK ID | EXECUTION STATUS (Status) | SCHEDULED EXECUTION TIME (Scheduled time) | HARDWARE RESOURCES TO BE USED (Resource [2:0]) |
| B_1 | Exe | 1ms | 101 |
| B_2 | Wait | 56ms | 101 |

Fig.9D

| Task A | | | |
|---|---|---|---|
| TASK ID | EXECUTION STATUS (Status) | SCHEDULED EXECUTION TIME (Scheduled time) | HARDWARE RESOURCES TO BE USED (Resource [2:0]) |
| A_3 | Wait | - | 011 |
| A_2 | Wait | 50ms | 011 |

| Task B | | | |
|---|---|---|---|
| TASK ID | EXECUTION STATUS (Status) | SCHEDULED EXECUTION TIME (Scheduled time) | HARDWARE RESOURCES TO BE USED (Resource [2:0]) |
| B_3 | Wait | - | 101 |
| B_2 | Wait | 56ms | 101 |

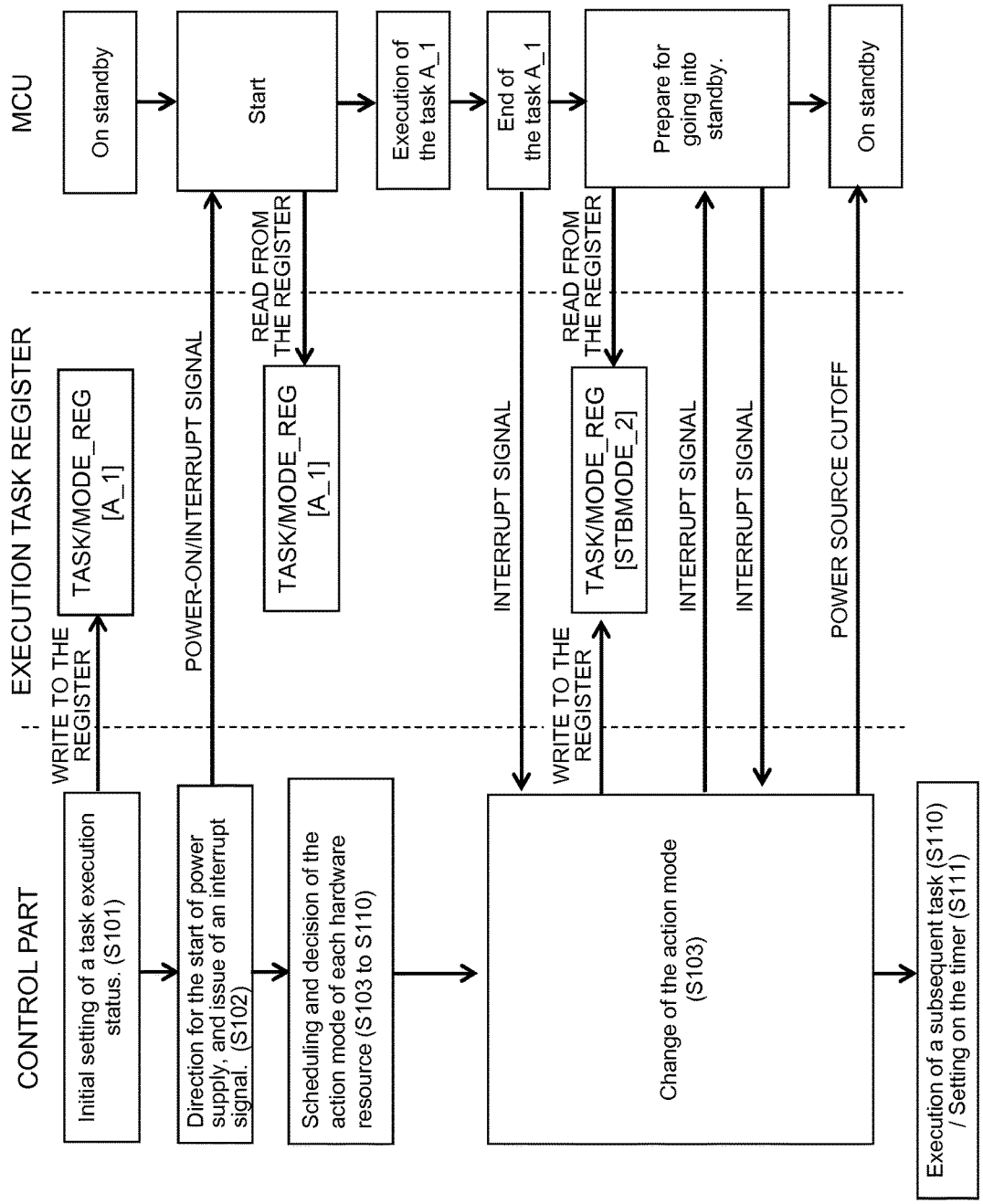

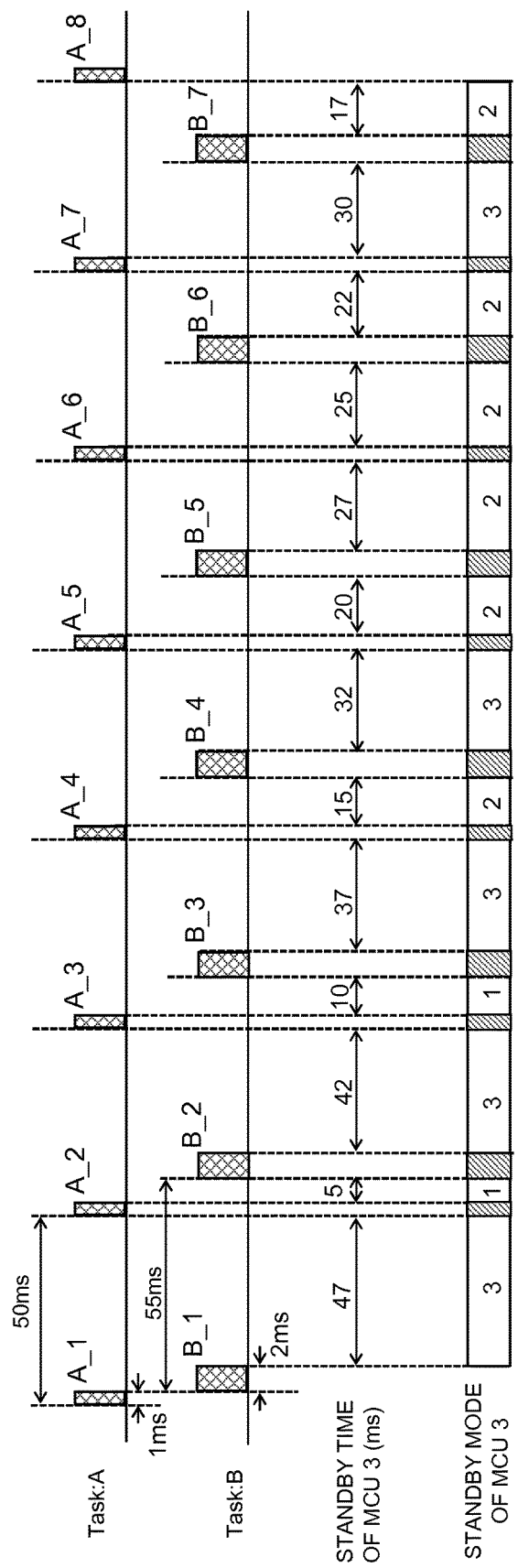

Fig.14
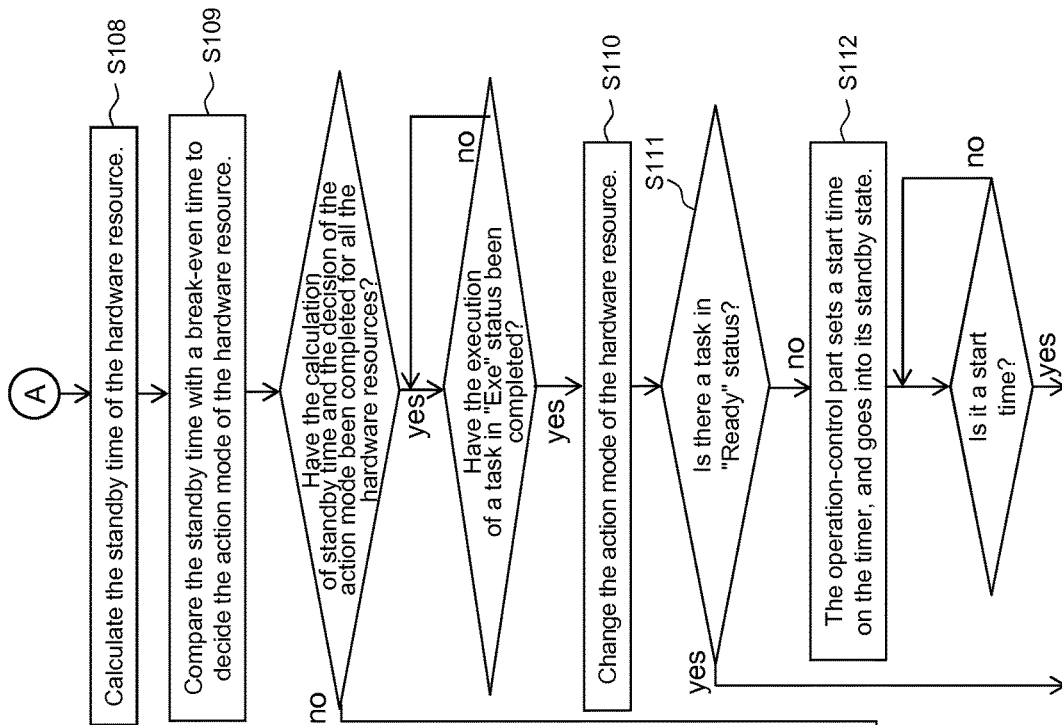
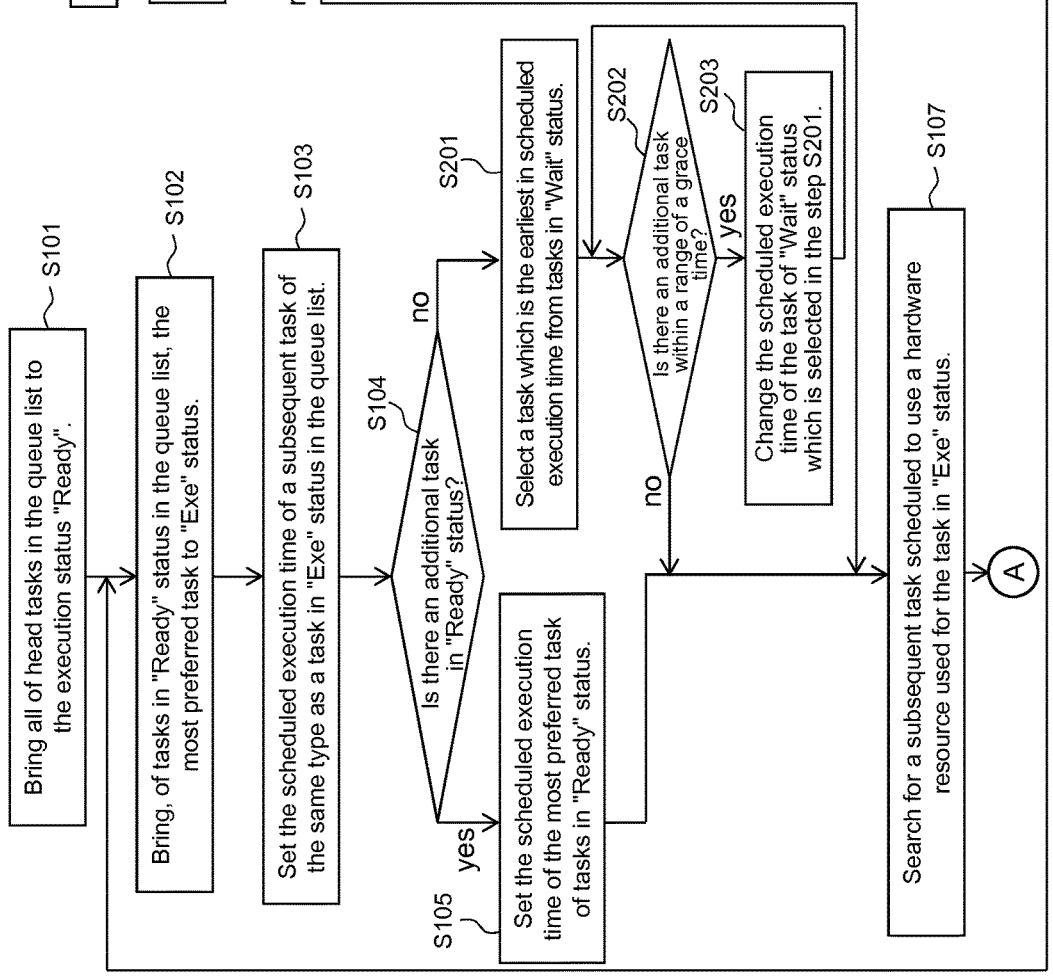

Fig.15A

| | Task A | | | |
|---|---|---|---|---|
| TASK ID | EXECUTION STATUS (Status) | SCHEDULED EXECUTION TIME (Scheduled time) | RESCHEDULED EXECUTION TIME (Rescheduled time) | HARDWARE RESOURCES TO BE USED (Resource [2:0]) |
| A_1 | Ready | 0ms | - | 011 |
| A_2 | Wait | - | - | 011 |

| | Task B | | | |
|---|---|---|---|---|
| TASK ID | EXECUTION STATUS (Status) | SCHEDULED EXECUTION TIME (Scheduled time) | RESCHEDULED EXECUTION TIME (Rescheduled time) | HARDWARE RESOURCES TO BE USED (Resource [2:0]) |
| B_1 | Ready | 0ms | - | 101 |
| B_2 | Wait | - | - | 101 |

Fig.15B

| | Task A | | | |
|---|---|---|---|---|
| TASK ID | EXECUTION STATUS (Status) | SCHEDULED EXECUTION TIME (Scheduled time) | RESCHEDULED EXECUTION TIME (Rescheduled time) | HARDWARE RESOURCES TO BE USED (Resource [2:0]) |
| A_1 | Exe | 0ms | - | 011 |
| A_2 | Wait | 50ms | - | 011 |

| | Task B | | | |
|---|---|---|---|---|
| TASK ID | EXECUTION STATUS (Status) | SCHEDULED EXECUTION TIME (Scheduled time) | RESCHEDULED EXECUTION TIME (Rescheduled time) | HARDWARE RESOURCES TO BE USED (Resource [2:0]) |
| B_1 | Ready | 1ms | - | 101 |
| B_2 | Wait | - | - | 101 |

Fig.15C

| | Task A | | | |
|---|---|---|---|---|
| TASK ID | EXECUTION STATUS (Status) | SCHEDULED EXECUTION TIME (Scheduled time) | RESCHEDULED EXECUTION TIME (Rescheduled time) | HARDWARE RESOURCES TO BE USED (Resource [2:0]) |
| A_3 | Wait | - | - | 011 |
| A_2 | Wait | 50ms | 55ms | 011 |

| | Task B | | | |
|---|---|---|---|---|
| TASK ID | EXECUTION STATUS (Status) | SCHEDULED EXECUTION TIME (Scheduled time) | RESCHEDULED EXECUTION TIME (Rescheduled time) | HARDWARE RESOURCES TO BE USED (Resource [2:0]) |
| B_1 | Exe | 1ms | - | 101 |
| B_2 | Wait | 56ms | - | 101 |

Fig.15D

| | Task A | | | |
|---|---|---|---|---|
| TASK ID | EXECUTION STATUS (Status) | SCHEDULED EXECUTION TIME (Scheduled time) | RESCHEDULED EXECUTION TIME (Rescheduled time) | HARDWARE RESOURCES TO BE USED (Resource [2:0]) |
| A_3 | Wait | - | - | 011 |
| A_2 | Wait | 50ms | 55ms | 011 |

| | Task B | | | |
|---|---|---|---|---|
| TASK ID | EXECUTION STATUS (Status) | SCHEDULED EXECUTION TIME (Scheduled time) | RESCHEDULED EXECUTION TIME (Rescheduled time) | HARDWARE RESOURCES TO BE USED (Resource [2:0]) |
| B_3 | Wait | - | - | 101 |
| B_2 | Wait | 56ms | - | 101 |

DATA PROCESSING SYSTEM WITH SELECTIVE ENGAGEMENT OF STANDBY MODE BASED ON COMPARISON WITH A BREAK-EVEN TIME

CROSS-REFERENCE TO RELATED APPLICATIONS

The Present application claims priority from Japanese application JP 2013-204651 filed on Sep. 30, 2013, the content of which is hereby incorporated by reference into this application.

BACKGROUND

The present invention relates to a data processing system, and particularly to a technique useful in application to a data processing system which requires a low power consumption.

To materialize a desired function, a data processing system such as a portable terminal device (terminal device) or a server is arranged by mutually connecting a plurality of electronic components such as a microcontroller, a memory, a sensor and a power source IC. In such a data processing system, e.g. a microcontroller appropriately executes an interrupt process in response to an interrupt request from a sensor, a power source IC, or the like while controlling the whole system. For instance, the Japanese Unexamined Patent Application Publication No. JP-A-2009-175971 discloses a microcontroller which performs scheduling so as to execute, by priority, a periodic task for control even if an interrupt by a task for information occurs.

Meanwhile, the need for power saving in a data processing system has been increasing in recent years. To achieve the power saving in a data processing system, it is essential to suppress the power consumption by individual semiconductor integrated circuits forming the data processing system. In recent years, a technique called "power gating" attracts attention as a technique for power saving of semiconductor integrated circuits. The power gating is a method for reducing the power consumption of a semiconductor integrated circuit on the whole by which a leak current of a circuit block concerned is suppressed by cutting off the power supply to the circuit block which does not work in the semiconductor integrated circuit.

Examples of such technique have been disclosed. One of them is a technique in connection with SOC (System-on-a-chip) for mobile use applicable to a portable terminal device (or a terminal device) and the like for cutting off a power supply to a circuit block (e.g. IP) which does not work according to the action mode of a portable terminal device (or a terminal device), which has been disclosed by: T. Hattori, et. al., "Hierarchical power distribution and power management scheme for a single chip mobile processor", Proc. of DAC, pp. 292-295, 2006.

Another example is a technique for cutting off a power source at the level of an operational device inside CPU by using, as conditional branches, an instruction set level, a cache miss action and the like, which has been disclosed by: D. Ikebuchi and et. al., "Geyser-1: A mips r3000 cpu core with fine grain runtime power gating," IEEE Asian Solid-State Circuits Conference Nov. 16-18, 2009, Taipei, Taiwan.

SUMMARY

The inventor made a study of a data processing system including a plurality of electronic components concerning the reduction in power consumption of the whole system by means of performing the cutoff of a power source (power gating) on each electronic component. As a result of the study, it was clarified that there is a problem as described below.

In general, it has been known concerning the power gating that energy consumption (overhead) is caused at the time of transition from a state of supplying a power source to a state of cutting off the power source, and the time of transition from the state of cutting off the power source to the state of supplying the power source. A point of time making a critical point at which a decrease in power consumption owing to the transition to a standby mode in which e.g. power source cutoff is performed exceeds an overhead produced by the transition to the standby mode is termed "break-even time (BET: Break-even time)"; in case that the duration of the standby mode is longer than the break-even time BET, the effect of reducing the power consumption is achieved. The method of simply cutting off the power source of an electronic component out of action without factoring in the break-even time BET as in the scheme for SoC for mobile use disclosed in "Hierarchical power distribution and power management scheme for a single chip mobile processor" by T. Hattori, et. al. depends on an application, often has difficulty or impossibility in achieving the effect of reducing electric power sufficiently according to a general-purpose usage, and is in danger of ending up increasing a power consumption under the condition of a high frequency of switching between power supply and cutoff. The method disclosed by D. Ikebuchi and et. al., in "Geyser-1: A mips r3000 cpu core with fine grain runtime power gating" is arranged so that the frequency of cutting off the power source of each operational device inside CPU in terms of time is changed factoring in the break-even time BET, but it is a technique for performing the power gating of each operational device inside CPU under the sophisticated control in which an instruction set level, a cache miss action and the like are used as conditional branches, so the technical contents of the document presented by D. Ikebuchi and et. al. cannot be directly applied to a data processing system as described above.

Means for solving the problems as described above and others will be described below. Other problems and novel features will become apparent from the description hereof and the accompanying drawings.

Of the embodiments herein disclosed, the representative one will be briefly outlined below.

A data processing system has: a plurality of hardware resources each having at least one standby mode; a control part for controlling execution of a task achieved by using, of the plurality of hardware resources, predetermined ones, and a working status of each hardware resource; and a power-source part for controlling supply of a power source to each hardware resource according to a direction from the control part. The control part performs the scheduling of a scheduled execution time of the task based on information for determining a timing of executing the task, and calculates a standby time until the hardware resource is used for the task next time based on a result of the scheduling. The control part compares the calculated standby time with a break-even time depending on the standby mode of a preset hardware resource concerned, thereby deciding, for each hardware resource, whether or not to cause the hardware resource to transition to the standby mode.

Of the embodiments herein disclosed, the representative embodiment brings about the effect as briefly described below.

The data processing system enables the reduction in power consumption.

BRIEF DESCRIPTION OF THE DRAWINGS

FIGS. 3A to 3C are each a diagram showing, by example, action modes of each hardware resource;

FIG. 5 is a diagram showing an example of task management information according to the first embodiment;

FIGS. 9A to 9D are each a diagram showing the way of updating the queue list in the data processing system according to the first embodiment;

FIG. 10 is a diagram showing a flow of communication between the control part 10 and MCU 3 at the time of changing the action mode of MCU 3;

FIG. 11 is a diagram showing a result of task scheduling, and examples of transition states in the action mode of MCU in the data processing system according to the first embodiment;

FIG. 14 is a diagram showing an example of a flow of task scheduling and action mode decision according to the second embodiment;

FIGS. 15A to 15D are each a diagram showing the way of updating the queue list in a data processing system according to the second embodiment;

DETAILED DESCRIPTION

1. Summary of the Embodiments

Figure 1:
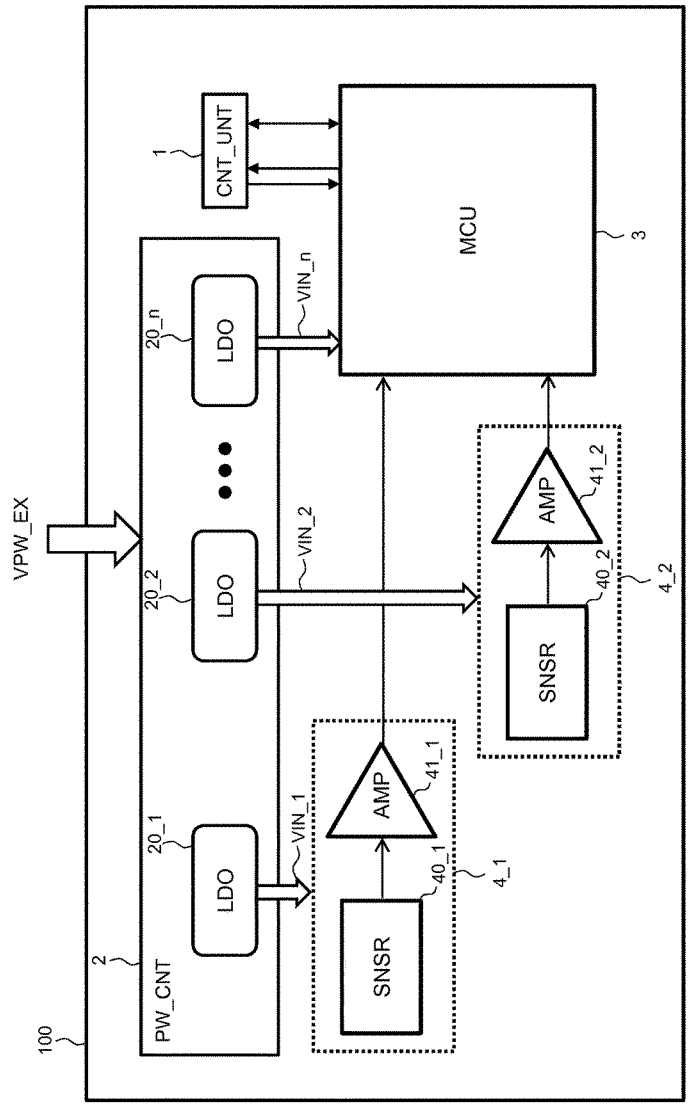
FIG. 1 is a diagram showing a data processing system according to an embodiment hereof.

First, summary of representative embodiments of the invention disclosed in the application will be described. Reference numerals in drawings in parentheses referred to in description of the summary of the representative embodiments just denote components included in the concept of the components to which the reference numerals are designated.

[1] (A Data Processing System which Determines the Transition of Each Hardware Resource to a Standby Mode by Comparing the Standby Time of Each Hardware Resource Calculated Based on Task Management Information with a Break-even Time)

A data processing system according to the representative embodiment hereof has, as shown FIG. 1, a plurality of hardware resources (3, 4_1, 4_2) each having at least one standby mode, and a control part (1) for controlling execution of a task achieved by using, of the plurality of hardware resources, predetermined ones and a working status of each hardware resource. Further, the data processing system has a power-source part (2) for controlling the supply of a power source (VIN_1 to VIN_n) to each hardware resource according to a direction from the control part. The control part performs scheduling of a scheduled execution time of the task based on information (TMI, TMIA) for determining a timing of executing the task, and calculates a standby time (Tw) until the hardware resource is used for the task next time based on a result of the scheduling. Further, the control part compares the calculated standby time with a break-even time (Tbe1 to Tbe5) depending on the standby mode of the preset hardware resource concerned, thereby deciding, for each hardware resource, whether or not to cause the hardware resource to transition to the standby mode.

According to the embodiment like this, each hardware resource can be controlled to transfer to a standby mode in case that the effect of reducing the power consumption is achieved. Therefore, unlike a simple control method arranged to transfer a hardware resource to a standby mode on condition that the hardware resource is put in a situation such that it need not work as in the past, the power consumption of a data processing system can be effectively reduced on the whole.

[2] (Scheduling Based on Task Management Information, and Calculation of a Standby Time)

In the data processing system as described in [1], the information for determining a timing of executing the task includes: a cycle (Tc) to execute the task with; an execution time (Ton) of the task; and resource information (Rs) designating the hardware resource used for executing the task. The control part performs scheduling of the scheduled execution time of the task based on the cycle to execute the task with. The control part further calculates, based on a difference between an execution-completion time of a predetermined task which uses a predetermined hardware resource designated by the resource information and a scheduled execution time of a task scheduled to be executed subsequently to the predetermined task while using the predetermined hardware resource, the standby time of the predetermined hardware resource. The execution-completion time is calculated by adding up an execution-start time of the task using the predetermined hardware resource, and an execution time of the task.

According to the embodiment like this, the scheduled execution time of a task can be scheduled readily, and the standby time can be calculated for each hardware resource readily.

[3] (Standby Mode Selected Based on a Result of Comparison Between the Standby Time and BET)

The data processing system as described in [2] further includes, as one of the plurality of hardware resources, a device having a first standby mode (STB1, STB2) in which supply of a power source is not cut off, and a second standby mode (STB3) in which supply of the power source is cut off. The break-even time of the device includes a first break-even time (Tbe1, Tbe2) depending on the first standby mode, and a second break-even time (Tbe3) depending on the second standby mode. The second break-even time is made larger than the first break-even time. When causing the device to transition to a standby mode, the control part causes the device to transition to the first standby mode in case that the calculated standby time (Tw) of the device is larger than the first break-even time, and smaller than the second break-even time, whereas the control part causes the device to transition to the second standby mode in case that the calculated standby time of the device is larger than the second break-even time.

According to the embodiment like this, an optimum standby mode is selected according to the standby time of the device. Therefore, the power consumption of the device can be reduced effectively, which contributes to further power saving of the whole data processing system.

[4] (Microcontroller)

In the data processing system as described in [3], the device is a microcontroller.

[5] (Reschedule a Task Subjected to Scheduling so that the Standby Time Becomes Longer)

In the data processing system as described in any of [2] to [4], the control part is arranged to be able to change to make shorter a time interval between a scheduled execution-start time of the desired task subjected to scheduling, and a scheduled execution-start time of the task scheduled to be executed subsequently.

According to the embodiment like this, correction is made based on a result of the scheduling so that the interval between task executions is made shorter and therefore, the standby time of each hardware resource can be made longer. Consequently, an energy overhead involved in transition is reduced by reducing the number of status transitions of each hardware resource and a period during which each hardware resource can be kept on standby is made longer. Therefore, the power consumption can be expected to be further reduced. Especially, in the case of a data processing system including a device (such as a microcomputer) having a standby mode in which a power source is cut off, and a standby mode in which the power source is not cut off, the probability of transition to a standby mode in which the power source is cut off is increased by making the standby time longer and therefore, further reduction of electric power can be expected.

[6] (Detail of the Rescheduling)

In the data processing system as described in [5], the information for determining a timing of executing the task further includes a piece of information on a grace time (Tex) showing a time which enables deviation from a cycle to execute the task with. The control part changes a scheduled execution time of the desired task so that the task scheduled to be executed subsequently is executed subsequently to the desired task on condition that execution of the task scheduled to be executed subsequently is scheduled within the grace time from a scheduled execution-start time of the desired task subjected to scheduling.

According to the embodiment like this, the standby time of a hardware resource can be made longer while keeping periodic execution of a task.

[7] (Break-even Time BET Corresponding to Each Temperature)

In the data processing system as described in any of [2] to [6], a number of the break-even times (HWI_TL, HWI_TM, HWI_TH) each depending on the standby mode are set corresponding to pieces of temperature information. The control part selects any one of the number of the break-even times based on input temperature information, and uses the selected break-even time to decide whether or not to cause the hardware resource to transition to a standby mode.

In general, it is known that a break-even time in connection with the power source cutoff changes depending on a temperature. Therefore, an optimum standby mode can be selected more correctly by changing the break-even time according to the temperature as performed in the data processing system, and the power consumption of a data processing system can be effectively reduced regardless of the temperature.

[8] (Circuit Current of LDO)

In the data processing system as described in any of [3] to [7], the power-source part has a plurality of regulator circuits (20_1 to 20_n) for each supplying a power source to corresponding one of the plurality of hardware resources. When causing each hardware resource to transition to a standby mode, the control part performs control to make smaller a circuit current (IBS) of the regulator circuit corresponding to the hardware resource.

According to the embodiment like this, it becomes possible to further reduce the power consumption of a whole data processing system.

[9] (Change LDO Circuit Current in Each Standby Mode)

In the data processing system as described in [8], when causing the device to transition to the second standby mode, the control part performs control to cut off an operation current of the regulator circuit corresponding to the device. On the other hand, when causing the microcontroller to transition to the first standby mode, the control part performs control to make an operation current of the regulator circuit corresponding to the device smaller than usual.

According to the embodiment like this, the power consumption can be effectively suppressed while ensuring the responsiveness required of a regulator circuit operable to supply a power source to the microcontroller.

[10] (Change the Interval Between Task Executions)

In the data processing system as described in any of [4] to [9], the task includes a first task (task A or B) which requires the microcontroller to periodically receive data from outside. The microcontroller calculates an amount of change of data received with a desired timing owing to execution of the first task from data received with a timing prior thereto, and the microcontroller updates the information for determining a timing of executing the task to make the first task execution cycle longer on condition that the calculated amount of change does not exceed a predetermined threshold.

According to the embodiment like this, the execution interval of the first task becomes longer and therefore, the standby time of the hardware resource (such as a microcontroller) used for execution of the first task can be made longer, so further reduction in power consumption can be expected.

[11] (Data Processing System which Reschedules a Scheduled Task to have Longer Standby Time)

A data processing system (100) according to another representative embodiment hereof has: a plurality of hardware resources (3, 4_1, 4_2) each having at least one standby mode; and a control part (1) for controlling execution of a task achieved by using, of the plurality of hardware resources, predetermined ones, and a working status of each hardware resource. The data processing system further includes a power-source part (2) for controlling supply of a power source to each hardware resource according to a direction from the control part. The control part performs scheduling of a scheduled execution time of the task based on information (TMIA) for determining a timing of executing the task, and directs predetermined ones of the plurality of hardware resources to be supplied with a power source and the hardware resources to execute the task based on a result of the scheduling. The control part is arranged to be able to change a scheduled execution time of a desired task within a predetermined time so as to make shorter a time interval between a scheduled execution-start time of the desired task and a scheduled execution-start time of a task scheduled to be executed subsequently when performing the scheduling.

According to the embodiment like this, it is possible to improve a result of the scheduling so as to make shorter the interval between task executions. Therefore, the standby time of each hardware resource can be made longer. Thus, the power consumption can be expected to be further reduced by performing control to cause a hardware resource concerned to transfer to a standby mode with a hardware resource on standby, for example.

[12] (Detail of the Rescheduling)

In the data processing system as described in [11], the information for determining a timing of executing the task includes: a cycle (Tc) to execute the task with; an execution time (Ton) of the task; a piece of information (Rs) designating the hardware resource used for executing the task; and a grace time (Tex) showing a time which enables deviation from a cycle to execute the task with. The control part performs scheduling of the scheduled execution time of the task based on the cycle to execute the task with, and the control part changes a scheduled execution time of a predetermined task subjected to scheduling so that an additional task is executed subsequently to the predetermined task on condition that execution of the additional task is scheduled within the grace time from a scheduled execution-start time of the predetermined task.

The embodiment like this facilitates: performing scheduling of a scheduled execution time of a task; and correcting a result of the scheduling to make longer the standby time of a hardware resource concerned while keeping periodically executing a task.

[13] (Decide to Cause Each Hardware Resource to Transition to the Standby Mode Based on a Result of Comparison Between the Standby Time and the Break-even Time)

In the data processing system as described in [11] or [12], the control part calculates a standby time until the hardware resource is used for the task next time based on a result of the scheduling. Further, the control part compares the calculated standby time with a break-even time depending on the standby mode of the preset hardware resource concerned, thereby deciding, for each hardware resource, whether or not to cause the hardware resource to transition to the standby mode.

According to the embodiment like this, each hardware resource can be controlled to transfer to a standby mode in case that the effect of reducing the power consumption is achieved. Therefore, unlike a simple control method arranged to transfer a hardware resource to a standby mode on condition that the hardware resource is put in a situation such that it need not work as in the past, the power consumption of a data processing system can be effectively reduced on the whole.

[14] (Calculation of the Standby Time)

In the data processing system as described in [13], the control part calculates, based on a difference between an execution-completion time of a predetermined task which uses a predetermined hardware resource designated by the resource information and a scheduled execution time of a task scheduled to be executed subsequently to the predetermined task while using the predetermined hardware resource, the standby time of the predetermined hardware resource. The execution-completion time is calculated by adding up an execution-start time of the task using the predetermined hardware resource, and an execution time of the task.

According to the embodiment like this, the standby time can be calculated for each hardware resource readily.

[15] (Standby Mode Selected Based on a Result of Comparison Between the Standby Time and BET)

The data processing system as described in [14], further includes, as one of the plurality of hardware resources, a microcontroller having a first standby mode (STB1, STB2) in which supply of a power source is not cut off, and a second standby mode (STB3) in which supply of the power source is cut off. The break-even time of the microcontroller includes a first break-eventime (Tbe1, Tbe2) depending on the first standby mode, and a second break-even time (Tbe3) depending on the second standby mode, and the second break-even time is made larger than the first break-even time. When causing the microcontroller to transition to a standby mode, the control part causes the microcontroller to transition to the first standby mode in case that the calculated standby time (Tw) of the microcontroller is larger than the first break-even time, and smaller than the second break-even time. On the other hand, the control part causes the microcontroller to transition to the second standby mode in case that the calculated standby time of the microcontroller is larger than the second break-even time.

According to the embodiment like this, an optimum standby mode is selected according to the standby time of the microcontroller. Therefore, the power consumption of the device can be reduced effectively, which contributes to further power saving of the whole data processing system.

[16] (Break-even Time BET for Each Temperature)

In the data processing system as described in [14] or [15], a number of the break-even times (HWI_TL, HWI_TM, HWI_TH) each depending on the standby mode are set corresponding to pieces of temperature information. The control part selects any one of the number of the break-even times based on input temperature information, and uses the selected break-even time to decide whether or not to cause the hardware resource to transition to a standby mode.

According to the embodiment like this, an optimum standby mode can be selected more correctly, and the power consumption of a data processing system can be effectively reduced regardless of the temperature.

[17] (Circuit Current of LDO)

In the data processing system as described in [15] or [16], the power-source part has a plurality of regulator circuits (20_1 to 20_n) for each supplying a power source voltage to corresponding one of the plurality of hardware resources. When causing each hardware resource to transition to a standby mode, the control part performs control to make smaller a circuit current of the regulator circuit corresponding to the hardware resource.

According to the embodiment like this, the power consumption by the data processing system can be further reduced on the whole.

[18] (Change the Circuit Current of LDO in Each Standby Mode)

In the data processing system as described in [15], when causing the microcontroller to transition to the first standby mode, the control part performs control to cut off an operation current of the regulator circuit corresponding to the microcontroller. On the other hand, when causing the microcontroller to transition to the second standby mode, the control part performs control to make an operation current of the regulator circuit corresponding to the microcontroller smaller than usual.

According to the embodiment like this, the power consumption can be effectively suppressed while ensuring the responsiveness required of a regulator circuit operable to supply a power source to the microcontroller.

[19] (Change the Interval Between Task Executions)

In the data processing system as described in any of [13] to [16], the task includes a first task (task A or B) which requires the microcontroller to periodically receive data from outside. The microcontroller calculates an amount of change of data received with a desired timing owing to execution of the first task from data received with a timing prior thereto. The microcontroller updates the information for determining a timing of executing the task to make the first task execution cycle longer on condition that the calculated amount of change does not exceed a predetermined threshold.

According to the embodiment like this, the execution interval of the first task becomes longer and therefore, the standby time of the hardware resource (such as a microcontroller) used for execution of the first task can be made longer, so further reduction in power consumption can be expected.

2. Further Detailed Description of the Embodiments

The embodiments will be described further in detail. In all the drawings referred to in explanation of the embodiments for carrying out the invention, components having like functions are identified by the same numerals or signs, and the repetition of the description thereof is avoided.

<<First Embodiment>>

Figure 2:
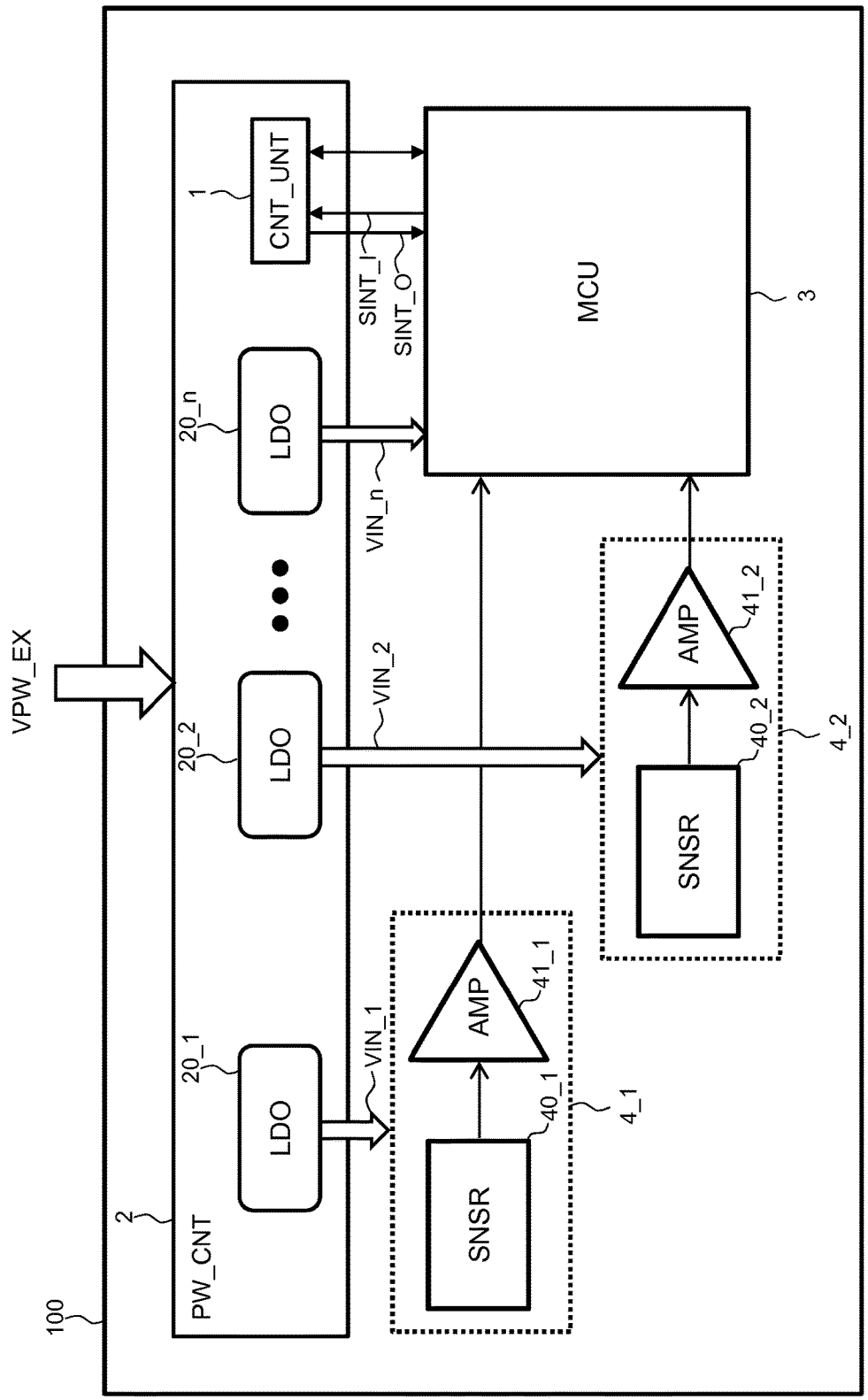
FIG. 2 is a diagram showing, by example, the configuration of the data processing system according to the first embodiment.

FIG. 2 is a diagram showing, by example, the configuration of the data processing system according to the first embodiment.

In the data processing system 100 shown in the drawing, a desired function is realized by executing various kinds of tasks by use of a plurality of hardware resources, for example. The data processing system 100 forms e.g. a sensor system, which performs various operations based on information detected by one or more sensors, thereby creating various data and controlling various devices. The data processing system 100 is e.g. a sensor system which is allowed to work based on electric power supply by e.g. a battery or an energy harvesting technique and which is required to work in a further advanced power-saving manner.

Specifically, the data processing system 100 includes a microcontroller (MCU) 3 and sensor parts 4_1 and 4_2 as hardware resources, and it further includes a power-source part (PW_CNT) 2 and a control part (CNT_UNT) 1. While, three hardware resources are representatively shown by example in FIG. 1, the data processing system may have another hardware resource, e.g. an external memory (RAM) or a wireless IC. In addition, the number of sensor parts which the data processing system 100 includes is not particularly limited.

The sensor part 4_1 includes e.g. a sensor device (SNSR) 40_1 operable to convert information input from the outside into electrical signals, and a power amplifier (AMP) 41_1 operable to amplify and output the analog signals produced by the conversion by the sensor device 40_1. The analog signals amplified by the power amplifier 41_1 are then supplied to MCU 3. Likewise, the sensor part 4_2 includes a sensor device 40_2 and a power amplifier 41_2. Although no special restriction is intended, the sensor device 40_1 serves to measure a temperature, whereas the sensor device 40_2 serves to measure a humidity, for example.

In MCU 3, analog signals supplied from the sensor parts 40_1 and 40_2 are converted into digital signals by means of an A/D converter; an operation-processing part (CPU) inside MCU performs various operation processes based on the digital signals. Results of such operation processes can be output to the outside as various information data and control data for controlling the devices. For instance, MCU 3 supplies a wireless IC (not shown) with results of detections by the sensor devices 40_1 and 40_2 as temperature data and humidity data. Then, the wireless IC sends the temperature data and the humidity data to a host system such as a server located outside by wireless communication through an antenna.

The power-source part 2 controls the power supply to the respective hardware resources according to directions given by the control part 1. The power-source part 2 includes a plurality of regulator circuits such as LDOs (LDO: Low Drop Out) or switching regulators each operable to generate a desired voltage based on an outside voltage supplied by e.g. a battery or an energy harvesting technique. For instance, the power-source part 2 is materialized by an electronic circuit having electronic components including a capacitor and an inductor, and a power source IC connected therein; the power source IC has various LDOs, a switching regulator controller and others formed on a semiconductor substrate such as a bulk of monocrystalline silicon according to the known CMOS integrated circuit manufacturing technology. The power-source part 2 is arranged to be able to control the power supplies to the hardware resources individually. More concretely, the power-source part 2 has regulator circuits (LDOs) 20_1 to 20_n (n is an integer of 2 or larger) which are provided for the hardware resources respectively; each regulator circuit controls the power supply to the corresponding hardware resource, and the cutoff thereof.

The sensor parts 4_1 and 4_2 and MCU 3 serving as hardware resources have, as action modes, a normal action mode and at least one standby mode.

FIGS. 3A to 3C are diagrams showing, by example, the action modes of the hardware resources. As shown in FIG. 3A, the sensor part 4_1 has e.g. two action modes, namely a non-standby mode (normal action mode) during which the power source is supplied, and a standby mode STB during which the supply of the power source is cut off. Further, as shown in FIG. 3B, the sensor part 4_2 has two action modes, namely a non-standby mode (normal action mode) during which the power source is supplied, and a standby mode STB during which the supply of the power source is cut off, as in the case of the sensor part 4_1. MCU 3 has a normal action mode and a plurality of standby modes. Specifically, MCU 3 has a non-standby mode (normal action mode) and three standby modes STB1, STB2 and STB3 as action modes as shown in FIG. 3C. Now, it is noted that this embodiment is described taking, as an example, MCU 3 having three standby modes, but the number of such standby modes is not particularly limited. The standby mode STB1 is e.g. an action mode for making the clock frequency of MCU 3 lower than that in the normal action mode; the standby mode STB2 is e.g. an action mode for making the clock frequency of MCU 3 and the source voltage thereof lower than those in the normal action mode; and the standby mode STB3 is e.g. an action mode for cutting off the power supply to MCU 3. The power-saving effect achieved in the standby mode STB2 is larger than that achieved in the standby mode STB1, and is smaller than that achieved in the standby mode STB3.

Which action mode each hardware resource works in is determined by the control part 1 comparing the standby time of the hardware resource with a break-even time BET in the standby mode. For instance, as shown in FIG. 3A, the sensor part 4_1 is controlled to transition to the standby mode in case that the standby time Tw is equal to or larger than the break-even time Tbe4. Likewise, the sensor part 4_2 is controlled to transition to the standby mode in case that the standby time Tw is equal to or larger than the break-even time Tbe5, as shown in FIG. 3B. Further, MCU 3 is controlled to transition to the standby mode in case that the standby time Tw is larger than the break-even time Tbe1, as shown in FIG. 3C. In this case, MCU 3 is controlled to transition to the standby mode STB1 if the standby time Tw is larger than the break-even time Tbe1 and smaller than the break-even time Tbe2, whereas it is controlled to transition to the standby mode STB2 if the standby time Tw is larger than the break-even time Tbe2 and smaller than the break-even time Tbe3. Further, in case that the standby time Tw is larger than the break-even time Tbe3, MCU 3 is controlled to transition to the standby mode STB3.

Next, the control part 1 will be described in detail.

The control part 1 controls the execution of a task which is achieved by use of a predetermined hardware resource, and the working status of the hardware resource. Specifically, the control part 1 performs the scheduling of a scheduled execution time of the task based on information for determining a timing of executing the task. According to a result of the scheduling, the control part 1 directs the power-source part 2 to supply a power source to a predetermined hardware resource, and directs the hardware resource to execute the task. Further, the control part 1 calculates, based on a result of the scheduling, a standby time until the hardware resource is used for executing the task next time, and compares the calculated standby time with a break-even time depending on the standby mode of a preset hardware resource, thereby deciding, for each hardware resource, whether or not to cause the hardware resource to transition to the standby mode. The detail of the action of the control part 1 will be concretely described below. The description on this embodiment is presented taking, as an example, a case where the control part 1 is formed in the power-source part 2 (inside the power source IC).

Figure 4:
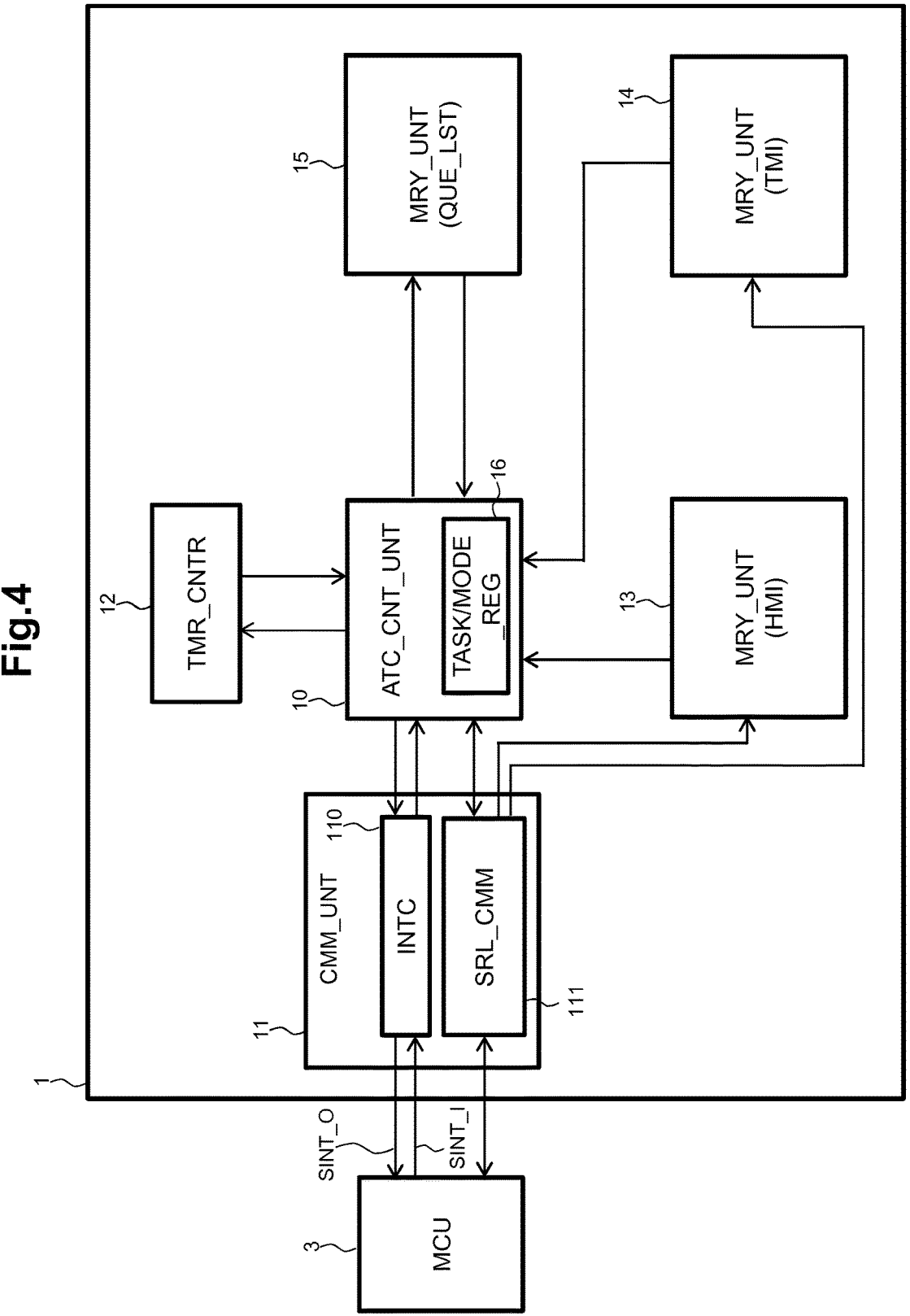
FIG. 4 is a diagram showing, by example, the inside configuration of the control part 1.

FIG. 4 is a diagram showing, by example the inside configuration of the control part 1. As shown in the drawing, the control part 1 includes: an operation-control part (ATC_CNT_UNT) 10; a communication part (CMM_UNT) 11; a timer part (TMR_CNTR) 12; and memory parts (MRY_UNT) 13 to 15.

The communication part 11 is a functional part for communication with an external device, which includes e.g. a serial communication control part (SRL_CMM) 110, and an interrupt communication part (INTC) 111. The serial communication control part 110 is a functional part for serial communication with an external device. For instance, the control part 1 performs serial communication with MCU 3 through the serial communication control part 110. The interrupt communication part 111 produces an interrupt signal SINT_O to MCU 3 in response to an interrupt request from the operation-control part 10, and issues an external interrupt request to the operation-control part 10 in response to an interrupt signal SINT_I from MCU 3 or other hardware resources.

The timer part 12 is a timer counter which measures time by counting a predetermined clock signal (not shown). For instance, in case that the operation-control part 10 directs the start of a counting action, the timer part 12 starts the action of counting a clock signal. Then, in case that the specified value set by the operation-control part 10 matches with a count value obtained by the counting action, the timer part notifies the operation-control part 10 of the fact.

The operation-control part 10 is a functional part for performing the scheduling of a task, the sequence control for task execution, various operation processes including a process involved in changing the action mode of each hardware resource, and the centralized control. The operation-control part 10 is not particularly limited, and it may be materialized by e.g. a hardware logic for exclusive use, or by program execution by a program processing device such as CPU or DSP. The details of the control by the operation-control part 10 are to be concretely described later.

The memory parts 13 to 15 store various pieces of information for the task scheduling, the sequence control, and the control of the change in action mode of each hardware resource or the like. The memory parts 13 to 15 are materialized by registers having memory regions for storing data, or memories, for example.

The memory part 13 stores information for determining a timing of executing a task (hereinafter referred to as "task management information") TMI. FIG. 5 shows an example of task management information. As shown in the drawing, the task management information TMI includes: a task execution cycle Tc, a task execution time Ton, the number of repetition of task execution Rc, and a piece of information Rs about hardware resources to be used. These information pieces are brought together according to the types of tasks which can be executed by the data processing system 100. The task execution cycle Tc is an information piece showing a cycle with which a task is executed regularly. The task execution time Ton is an information piece showing the time taken between the start of task execution and the end thereof. The number of repetition of task execution Rc is an information piece showing the number of executions of a task to be executed periodically. The information Rs about hardware resources to be used is an information piece for specifying a hardware resource required for executing the task. In this embodiment, MCU 3 is denoted by the hardware resource number "0", the sensor part 4_1 is denoted by the hardware resource number "1", and the sensor part 4_2 is denoted by the hardware resource number "2". Here, the task A is defined as "the process of taking a result of detection by the sensor part 4_1 into MCU 3", and the task B is defined as "the process of taking a result of detection by the sensor part 4_2 into MCU 3", for example. In this case, the following are shown from the task management information TMI of FIG. 5: the task A is a process which is repeatedly executed at intervals of 50 ms using the sensor part 4_1 and MCU 3, and the processing time of which is 1 ms; and the task B is a process which is repeatedly executed at intervals of 55 ms using the sensor part 4_2 and MCU 3, and the processing time of which is 2 ms. These information pieces are set on the memory part 13 through serial communication with MCU 3 in initialization after having released the power-on reset, for example.

Figure 6:
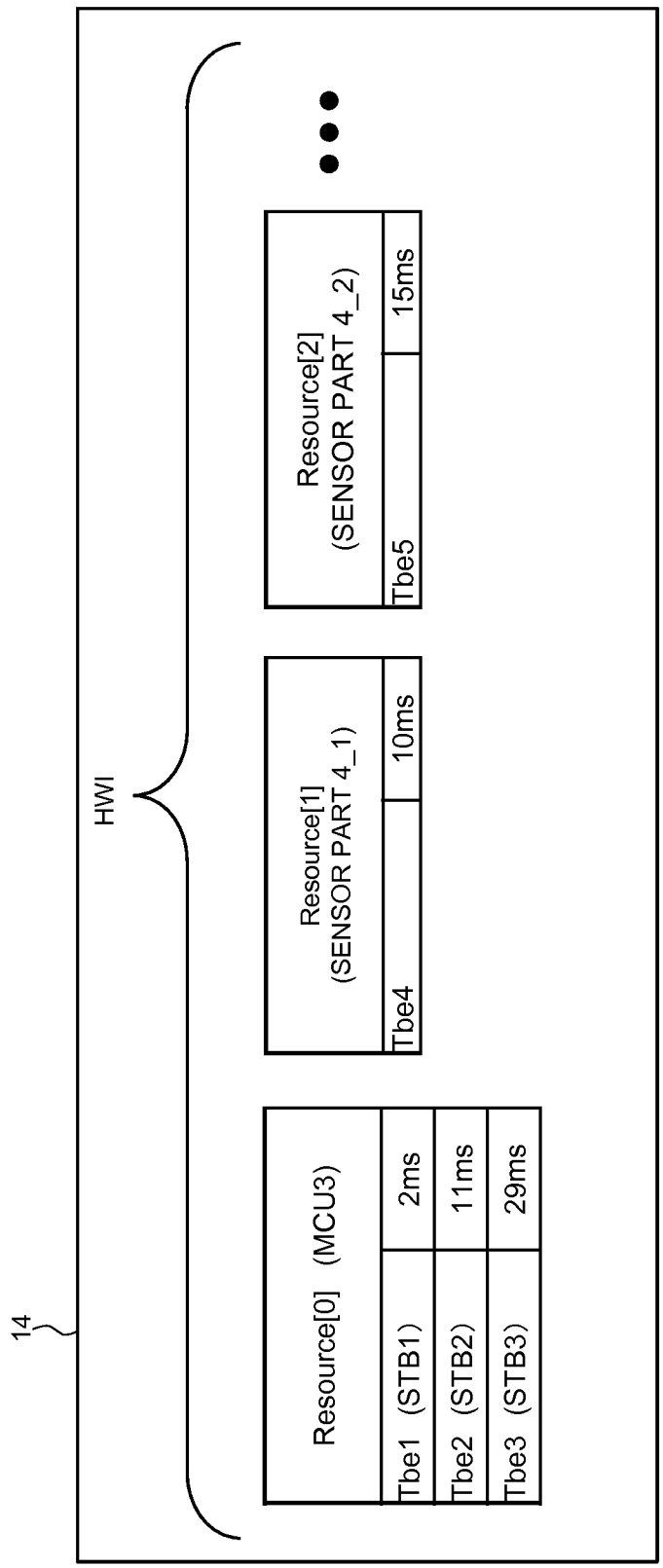
FIG. 6 is a diagram showing an example of hardware information according to the first embodiment.

The memory part 14 stores information on the hardware resources (hereinafter referred to as "hardware information") HWI. FIG. 6 shows an example of such hardware information. As shown in the drawing, the hardware information TMI includes the information concerning the break-even time of each standby mode of the hardware resources.

As described above, the time of a critical point at which a decrease of power consumption attributed to the transition to a standby mode becomes larger than an overhead owing to the transition to a standby mode at the cutoff of a power source or the like is referred to as "break-even time BET". The data processing system 100 according to this embodiment performs control to cause a hardware resource to transition to a predetermined standby mode in case that the standby time of the hardware resource is judged to be larger than the break-even time BET, the detail of which is to be described later.

As shown in FIG. 6, an information piece of the break-even time Tbe1 in the standby mode STB1, an information piece of the break-even time Tbe2 in the standby mode STB2, and an information piece of the break-even time Tbe3 in the standby mode STB3 are included as hardware information of MCU 3. In addition, an information piece of the break-even time Tbe4 in the standby mode STB as hardware information of the sensor part 4_1, and an information piece of the break-even time Tbe5 in the standby mode STB as hardware information of the sensor part 4_2 are included respectively. These information pieces are set on the memory part 14 through serial communication with MCU 3 in initialization after having released the power-on reset, for example. Now, it is noted that the value of each break-even time shown in the drawing is just an example, and various values can be set as the break-even time.

Figure 7:
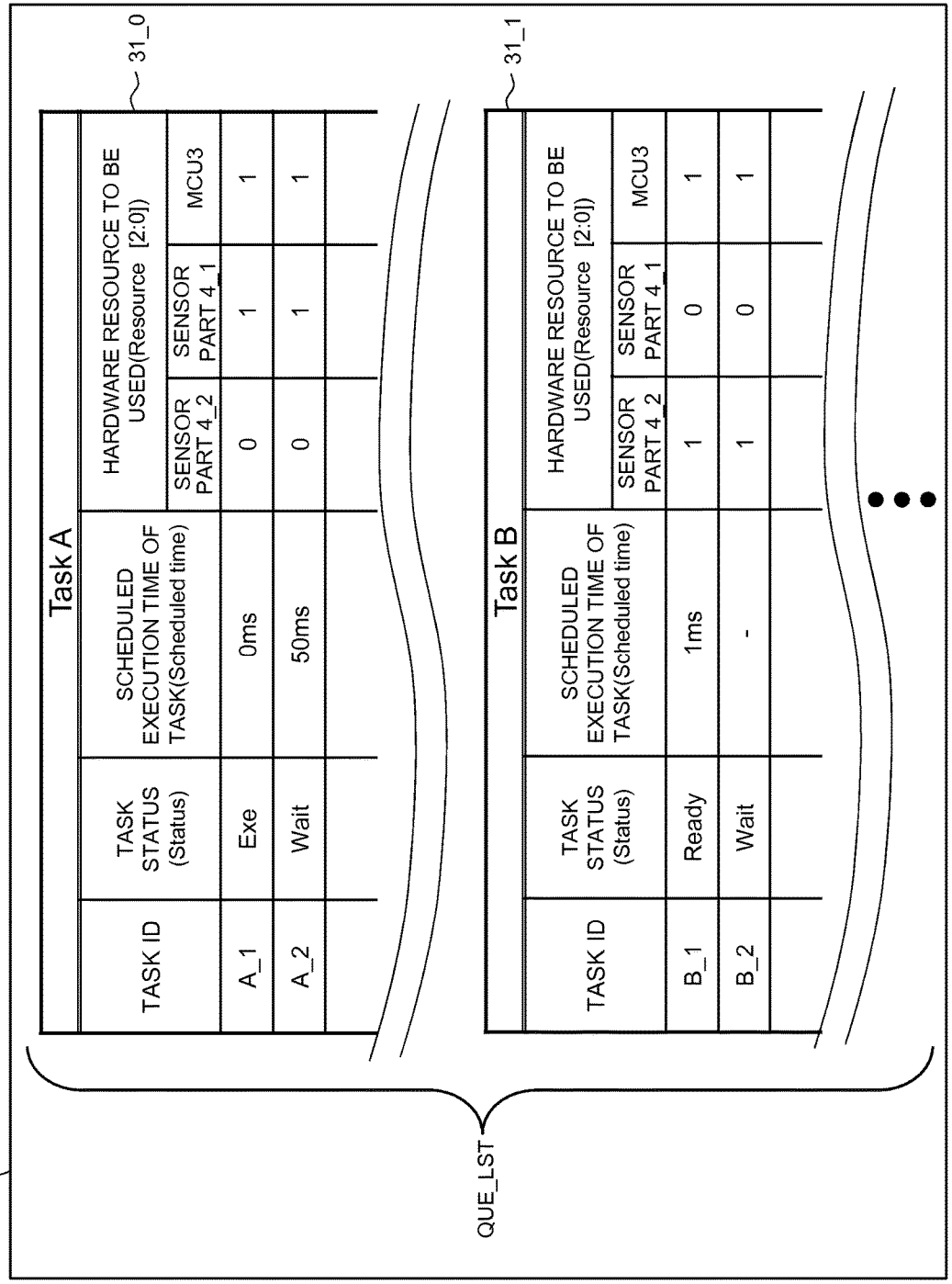
FIG. 7 is a diagram showing an example of a queue list according to the first embodiment.

The memory part 15 stores an information piece QUE_LST for managing an execution schedule of a task and an execution status thereof (hereinafter referred to as "queue list"). The queue list QUE_LST includes a list created for each task type. FIG. 7 shows an example of such queue list. For instance, as shown in the drawing, the queue list QUE_LST includes a list 31_0 of the task A, and a list 31_1 of the task B. Information pieces of a task ID (TASK ID), an execution status (Status) of the task, a scheduled execution time (Scheduled time), a hardware resource (Resource [2:0]) to be used and the like are stored in each of the lists 31_1 and 31_2. Herein, the task ID is a piece of identification information of a task, which is allocated to the task corresponding to the turn to execute the task of tasks of like types in. The information of the execution status of a task shows the status of the task which a task ID is allocated to. As to the information pieces of the execution status of a task, "Exe" means that a task of interest is being executed; "Ready" means that the task can be executed subsequently to the completion of execution of another task staying in "Exe" status; and "Wait" means that the task is on standby. The information of the scheduled execution time shows a scheduled time when a task which a task ID is allocated to is executed. The information about hardware resources to be used shows a hardware resource required for a task which a task ID is allocated to. Although no special restriction is intended, digits of the information about hardware resources to be used correspond to the hardware resources respectively, as shown in FIG. 7. For instance, the right-end digit represents MCU 3, the middle digit represents the sensor part 4_1, and the left-end digit represents the sensor part 4_2 in the drawing. The digit value "1" means that the hardware resource corresponding to that digit is used for executing the task of interest, and the digit value "0" means that the hardware resource corresponding to that digit is not used for executing the task of interest. For instance, it is shown from the list 31_0 of FIG. 7 that in executing tasks A_1 and A_2, MCU 3 and the sensor part 4_1 are used, but the sensor part 4_2 is not used. Likewise, it is shown from the list 31_1 of FIG. 7 that in executing tasks B_1 and B_2, MCU 3 and the sensor part 4_2 are used, but the sensor part 4_1 is not used. Now, it is noted that the specific numerical values and others written in FIG. 7 are only examples respectively.

Next, the control sequence according to the operation-control part 10 will be described with reference to FIGS. 8 and 9.

Figure 8:
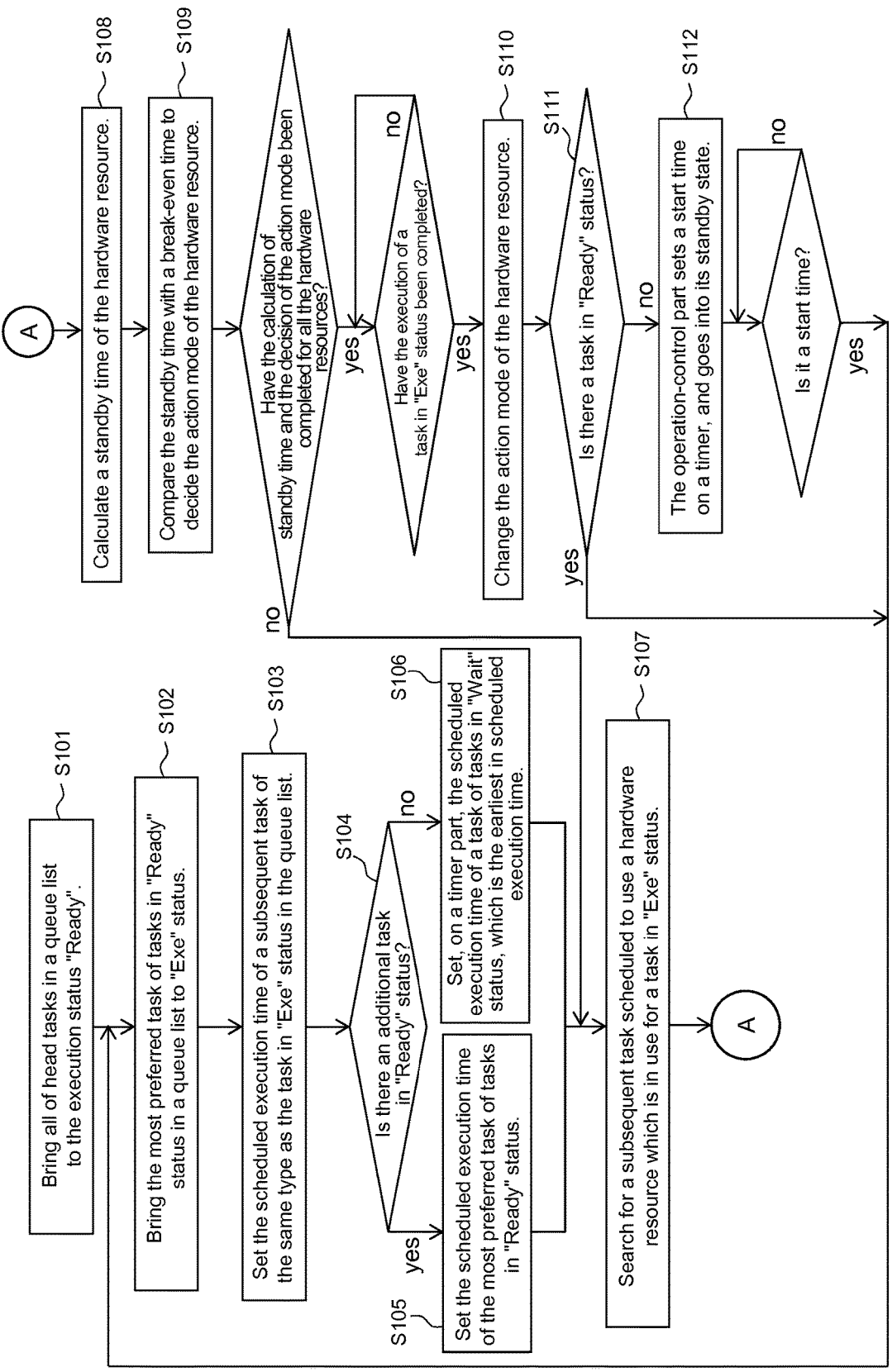
FIG. 8 is a diagram showing an example of a flow of task scheduling and action mode decision according to the first embodiment.

FIG. 8 is a diagram showing an example of a flow of task scheduling and action mode decision according to the first embodiment. FIGS. 9A to 9D are each a diagram showing the way of updating the queue list in the data processing system according to the first embodiment. For instance, the queue list according to the first embodiment is updated in the order of FIGS. 9A, 9B, 9C and 9D according to the flow shown in FIG. 8.

In the flow of FIG. 8, after having released the power-on reset or the like subsequent to the power-on, initial settings of task management information TMI and hardware information HWI are performed on the memory parts 13 and 14 first. Then, the operation-control part 10 creates a queue list based on the task management information TMI, and brings head tasks of tasks of all types in the queue list to the execution status "Ready" (S101), but brings the other tasks to "Wait" status. It is assumed here that the queue list as shown in FIG. 9A is created.

Next, the operation-control part 10 has, of tasks in "Ready" status, the most preferred task executed, and brings the task to the execution status "Exe" (S102). In this embodiment, the priority of each task is determined in the decreasing order of task execution cycle. Here, it is assumed that the task A_1 in the queue list of FIG. 9A is put in the execution status "Exe", whereby the queue list is updated as shown in FIG. 9B. The operation-control part 10 directs the power-source part 2 to supply a power source to a hardware device specified by information about "hardware resources to be used" in the queue list, and issues an activation trigger (e.g. an interrupt signal) to the hardware resource concerned, whereby the execution of a task is actually performed. In the case of the queue list of FIG. 9B, for example, the operation-control part 10 issues a direction for power supply to MCU 3 and the sensor part 4_1 and a direction for causing them to start working.

Next, the operation-control part 10 sets a scheduled execution time of a task of the same type as a task in "Exe" status in the queue list (S103). Specifically, the operation-control part 10 sets a scheduled execution time of the task based on a task execution cycle Tc in task management information TMI. For instance, in the case of the queue list of FIG. 9B, "50 ms" is set as the scheduled execution time of the task A_2 of the same type as the task A_1 in execution.

Next, the operation-control part 10 makes a judgment on whether or not there is an additional task in "Ready" status in the queue list (S104). If it is judged that there is an additional task in "Ready" status, the operation-control part 10 selects the most preferred task from the tasks in "Ready" status, and sets the scheduled execution time of the selected task (S105). Specifically, the operation-control part 10 sets, as the scheduled execution time of the selected task, the time shifted from the scheduled execution time of a task which is being executed at that time by the execution time of the task. For instance, in the example shown in FIG. 9B, the time "1 ms" after the elapse of an execution time (1 ms) of the task A_1 from the execution-start time (0 ms) of the task A_1 in execution is set as the scheduled execution time of the task B_1 in "Ready" status. On the other hand, if it is judged that there is no additional task in "Ready" status in the step S104, the operation-control part 10 selects a task which is the earliest in scheduled execution time from tasks in "Wait" status, and sets the scheduled execution time of the selected task on the timer part 12 (S106). For instance, in case that there is no additional task in "Ready" status as shown in FIG. 9C, the scheduled execution time (50 ms) of the task A_2, which is the earliest in scheduled execution time, of the tasks A_2 and B_2 in "Wait" status is set on the timer part 12. According to the process as described above, a task is scheduled in the queue list.

Next, the operation-control part 10 calculates the standby time of each hardware resource based on a result of the scheduling. The operation-control part 10 first selects any one of hardware resources in use for a task in execution right now (i.e. a task in "Exe" status), and then searches for a subsequent task scheduled to use the selected hardware resource (S107). Specifically, a task which is the earliest in scheduled execution time is selected from tasks of the same type as the task in execution right now, or from tasks different in type from the task in execution right now. Next, the operation-control part 10 calculates the standby time of the hardware resource (S108). Specifically, the execution time of a task in execution right now is added to the scheduled execution time of the task, whereby the scheduled termination time of the task in execution right now is calculated. Subsequently, the operation-control part 10 calculates a difference between the calculated scheduled termination time and the scheduled execution time of the task selected in the step S107, and sets the resultant time difference as the standby time of the hardware resource selected in the step S107. The operation-control part 10 compares the standby time of the predetermined hardware resource calculated in the step S108 with a break-even time BET in connection with each standby mode of the hardware resource to decide the action mode to cause the hardware resource to transition to subsequently (S109). The operation-control part 10 repeats the steps S107 to S109 until action modes of all the hardware resources are determined.

After completion of the execution of a task in "Exe" status, the operation-control part 10 causes each hardware resource to transition to the action mode decided in the step S109 (S110). Specifically, in the case of causing the predetermined hardware resource to transition to a standby mode, the operation-control part 10 directs the power-source part 2 to cut off the power source to the hardware, to lower the source voltage, or to do ditto, and issues an interrupt signal or the like to notify the hardware resource concerned to transfer to a standby mode. After that, the operation-control part 10 refers to the queue list and makes a judgment on whether or not there is an additional task in "Ready" status (S111). If it is judged that there is an additional task in "Ready" status, it returns back to the step S102, and repeatedly executes the above process steps (S102 to S110). If there is no additional task in "Ready" status, the operation-processing part 10 sets a start time on the timer part 12, and goes into its standby state (S112). For instance, with all the tasks staying in "Wait" status as shown in FIG. 9D, the operation-processing part 10 remains in the standby state until the scheduled execution time of the subsequent task (e.g. 50 ms, which is the scheduled execution time of the task A_2). Then, after having reached the start time set in the step S112, the operation-processing part 10 returns from the standby state in response to a notification from the timer part 12, and resumes processing from the step S102.

Now, the calculation of the standby time of each hardware resource, and a process involved in decision of the action mode thereof according to the steps S107 to S109 will be described with reference to FIGS. 9B and 9C concretely.

The procedure of deciding the action mode of each hardware resource based on a result of the scheduling as shown in FIG. 9B is as follows. As shown in FIG. 9B, the hardware resources used for the task A_1 in execution are the sensor part 4_1 and MCU 3. Since the sensor part 4_1 is scheduled to be used only for the task A_2, the operation-processing part 10 selects "task A_2" as a subsequent task scheduled to use the sensor part 4_1 in the step S107. On the other hand, MCU 3 is scheduled to be used for the task A_2 and the task B_1, and the task B_1 is earlier than the task A_2 in scheduled execution time and therefore, the operation-processing part 10 selects "task B_1" as a subsequent task scheduled to use MCU 3 in the step S107. Next, the operation-control part 10 calculates the standby time of the sensor part 4_1 and that of MCU 3 in the step S108. In the case of calculating the standby time of the sensor part 4_1, the the operation-control part 10 calculates the scheduled termination time (1 ms) of the task A_1 by adding up the scheduled execution time (0 ms) of the task A_1 in execution right now, and the execution time (1 ms) of the task A_1. Then, the operation-control part 10 calculates a difference (49 ms) between the calculated scheduled termination time (1 ms) of the task A_1, and the scheduled execution time (50 ms) of the task A_2 selected in the step S107, and determines the difference to be the standby time (49 ms) of the sensor part 4_1. Further, in the case of calculating the standby time of MCU 3, the operation-control part 10 calculates a difference (0 ms) between the scheduled termination time (1 ms) of the task A_1 thus calculated, and the scheduled execution time (1 ms) of the task B_1 selected in the step S107, and determines the difference to be the standby time (0 ms) of the sensor part 4_1. Then, the operation-control part 10 compares the standby time calculated in the step S108 with a break-even time. In this case, the standby time (49 ms) of the sensor part 4_1 is larger than the break-even time Tbe4 (10 ms) and therefore, the operation-control part 10 decides to cause the sensor part 4_1 to transition to a standby mode after completion of the task A_1. On the other hand, MCU 3 is to be uninterruptedly used for the task B_1 after the task A_1 because of the standby time (0 ms) of MCU 3. Therefore, the operation-control part 10 decides not to cause MCU 3 to transition to a standby mode, but to keep MCU 3 working in the normal action mode.

The procedure of deciding the action mode of each hardware resource based on a result of the scheduling as shown in FIG. 9C is as follows. As shown in FIG. 9C, the hardware resources used for the task B_1 in execution are the sensor part 4_2 and MCU 3. Since the sensor part 4_2 is scheduled to be used only for the task B_2, the operation-processing part 10 selects "task B_2" as a subsequent task scheduled to use the sensor part 4_2 in the step S107. On the other hand, MCU 3 is scheduled to be used for the task A_2 and the task B_2, and the task A_2 is earlier than the task B_2 in scheduled execution time and therefore, the operation-processing part 10 selects "task A_2" as a subsequent task scheduled to use MCU 3 in the step S107. Next, the operation-control part 10 calculates the standby time of the sensor part 4_2 and that of MCU 3 in the step S108. In the case of calculating the standby time of the sensor part 4_2, the operation-control part 10 calculates the scheduled termination time (3 ms) of the task B_1 by adding up the scheduled execution time (1 ms) of the task B_1 in execution right now, and the execution time (2 ms) of the task B_1. Then, the operation-control part 10 calculates a difference (53 ms) between the calculated scheduled termination time (3 ms) of the task B_1, and the scheduled execution time (56 ms) of the task B_2 selected in the step S107, and determines the difference to be the standby time (53 ms) of the sensor part 4_2. Further, in the case of calculating the standby time of MCU 3, the operation-control part 10 calculates a difference (47 ms) between the scheduled termination time (3 ms) of the task B_1 thus calculated, and the scheduled execution time (50 ms) of the task A_2 selected in the step S107, and determines the difference to be the standby time (47 ms) of MCU 3. Then, the operation-control part 10 compares the calculated standby time with a break-even time. In this case, the standby time (53 ms) of the sensor part 4_2 is larger than the break-even time Tbe5 (10 ms) and therefore, the operation-control part 10 decides to cause the sensor part 4_2 to transition to a standby mode after completion of the task B_1. On the other hand, the standby time (47 ms) of MCU 3 is larger than the break-even time Tbe3 (29 ms) and therefore, the operation-control part 10 decides to cause MCU 3 to transition to the standby mode STB3 (where the power source is cut off) after completion of the task B_1.

According to the procedure as described above, the standby time of each hardware resource is calculated, and the action mode of each hardware resource is decided.

Next, the communication between the control part 10 and MUC 3 will be described.

The MCU 3 makes reference to a task/mode register (TASK/MODE_REG) 16 provided in the operation-control part 10, thereby grasping the type of a task to be executed subsequently, the action mode to transition to subsequently, etc. The procedure of communication between the control part 10 and MCU 3 by use of the task/mode register 16 will be described with reference to FIG. 10 concretely.

FIG. 10 is a diagram showing a flow of communication between the control part 10 and MCU 3 at the time of changing the action mode of MCU 3. Now, it is noted that the step numbers noted in the drawing correspond to the step numbers of the flow diagram of FIG. 8 which has been already explained.

First, in the step S101, the operation-control part 10 brings all of head tasks in the queue list to the execution status "Ready" and then, sets a value designating a task to execute on the task/mode register 16. Here, it is assumed that the task A_1 is executed, so a value designating the task A_1 is set on the task/mode register 16.

In the step S102, the operation-control part 10 directs the power-source part 2 to start supplying a power source to MCU 3 and the sensor part 4_1 to be used for the task to execute, and issues an interrupt signal SINT_O to MCU 3, thereby directing MCU 3 to execute the task. After having accepted the power supply from the power-source part 2, and returned from the standby state in response to an interrupt signal SINT_O, MCU 3 first reads information set on the task/mode register 16. Then, MCU 3 executes the task A_1 designated by the task/mode register 16. During this period of time, the operation-control part 10 performs the processes of the steps S103 to S110, thereby performing task scheduling, and deciding the action mode based on the standby time of each hardware resource. Here, it is assumed that the standby mode STB2 is selected as the action mode to cause MCU 3 to transition to subsequently.

After completion of task execution, MCU 3 issues an interrupt signal SINT_I to the operation-control part 10. On receipt of the interrupt signal SINT_I, the operation-control part 10 sets a value designating the standby mode STB2 on the task/mode register 16. Then, the operation-control part 10 issues an interrupt signal SINT_O to MCU 3, thereby notifying it that the action mode of MCU 3 will be changed. On receipt of the interrupt signal SINT_O, MCU 3 reads a value in the task/mode register 16 through serial communication. Then, before transition to the standby mode STB2, MCU 3 performs a preparation process including the step of saving data and others set on various registers in a non-volatile memory or the like on an as-needed basis. After completion of the preparation process, MCU 3 issues an interrupt signal SINC_I to the operation-control part 10. On receipt of the interrupt signal SINC_I, the operation-control part 10 directs the power-source part 2 to change the condition of power supply to MCU 3 in the step S110. Thus, MCU 3 works in the standby mode STB2.

FIG. 11 shows a result of task scheduling, and examples of transition states in the action mode of MCU 3 in the data processing system according to the first embodiment. As described above, the execution cycle Tc of the task A is 50 ms, and its execution time Ton is 1 ms, whereas the execution cycle Tc of the task B is 55 ms, and its execution time Ton is 1 ms. Further, MCU 3 is used for both of the task A and the task B as described above. In the drawing, "1" represents a standby mode STB1, "2" represents a standby mode STB2, "3" represents a standby mode STB3, and a crosshatched portion represents a normal action mode (non-standby mode).

As shown in the drawing, the standby time of MCU 3 in a period between the completion of execution of the task B_1 and the execution of the task A_2 is "47 ms", which is larger than the break-even time Tbe3 (29 ms) of the standby mode STB3 of MCU 3. Therefore, MCU 3 is caused to transition to the standby mode STB3, and the power supply thereto is cut off in this period. In addition, the standby time of MCU 3 in a period between the completion of execution of the task A_2 and the execution of the task B_2 is "5 ms", which is larger than the break-even time Tbe1 (2 ms) of the standby mode STB1 of MCU 3, but smaller than the break-even time Tbe2 (11 ms) of the standby mode STB2. Therefore, MCU 3 is caused to transition to the standby mode STB1 in this period. In this way, an optimum standby mode is dynamically selected depending on the standby time of MCU 3.

The data processing system according to the first embodiment as described above is arranged to achieve the effect of sufficiently reducing the power consumption, and enables the reduction in the power consumption of a data processing system. This is because an optimum standby mode is decided for each hardware resource by comparing the standby time of each hardware resource with a break-even time BET depending on the standby mode, which is particularly useful as a method for effectively reducing the power consumption of a data processing system especially including a device (a microcontroller or the like) having a plurality of standby modes. Further, unlike a simple control method arranged to transfer a hardware resource to a standby mode on condition that the hardware resource is put in a situation such that it need not work as in the past, the power consumption of a data processing system can be effectively reduced on the whole. In addition, the use of task management information TMI facilitates scheduling tasks, and enables the standby time of each hardware resource to be calculated easily.

<<Second Embodiment>>

A data processing system according to the second embodiment has the function of changing (or rescheduling) the scheduled execution time of a task which has been scheduled once so as to make longer the standby time of a hardware resource in addition to the functions of the data processing system according to the first embodiment.

The data processing system according to the second embodiment is identical in main hardware configuration to the data processing system 10 according to the first embodiment, but different in the data structure of task management information stored in the memory part 13, and the data structure of a queue list stored in the memory part 15.

Figure 12:
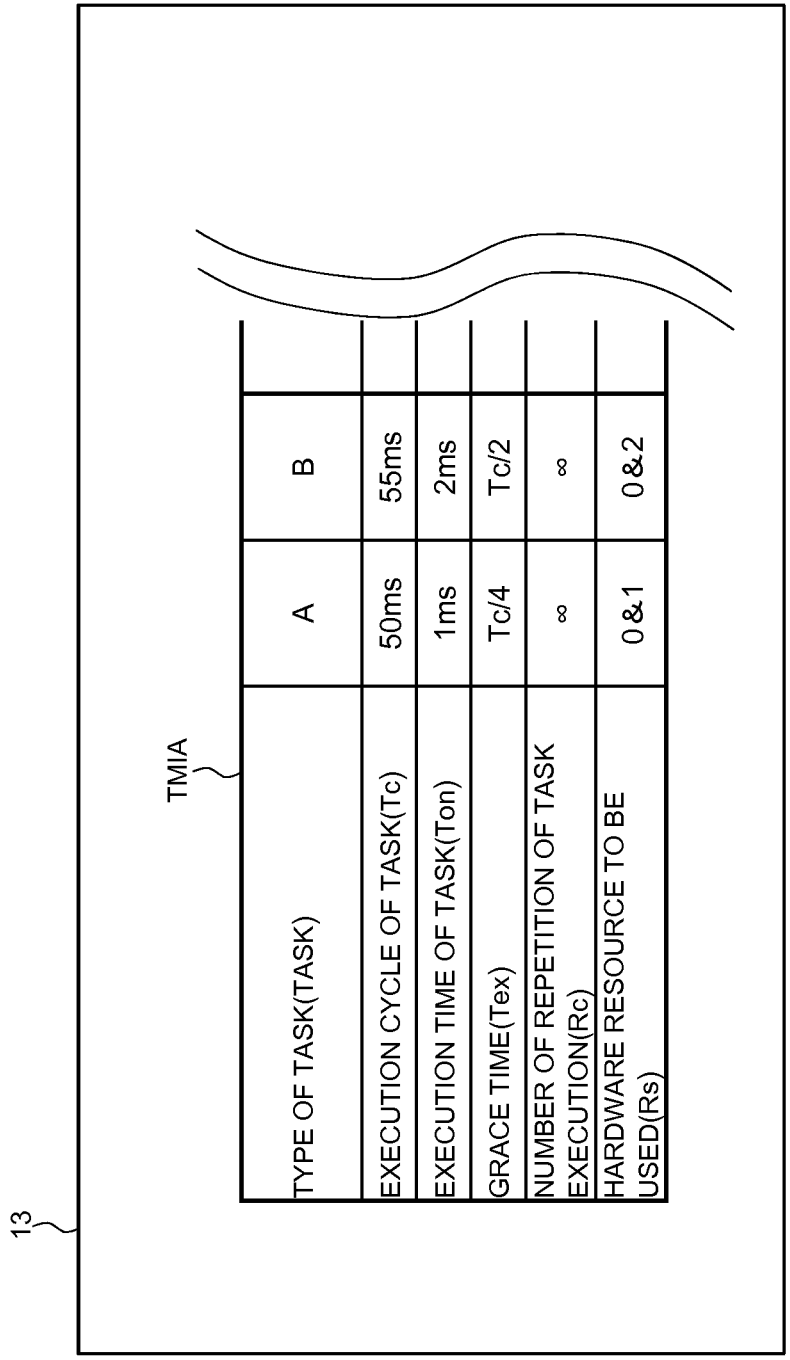
FIG. 12 is a diagram showing an example of task management information according to the second embodiment.

FIG. 12 is a diagram showing an example of task management information according to the second embodiment. The task management information TMIA shown in the drawing further includes information of grace time Tex in addition to the task management information TMI according to the first embodiment. The grace time Tex is a piece of information showing a length of time allows a deviation from a cycle to execute a task with. For instance, as shown in FIG. 12, in case that the execution cycle Tc of the task A is 50 ms, and the grace time Tex is Tc/4 (12.5 ms), the scheduled execution time of the task A_2 to be executed subsequently to the task A_1 executed at the time 0 ms can be set within a range of "50+12.5 ms".

Figure 13:
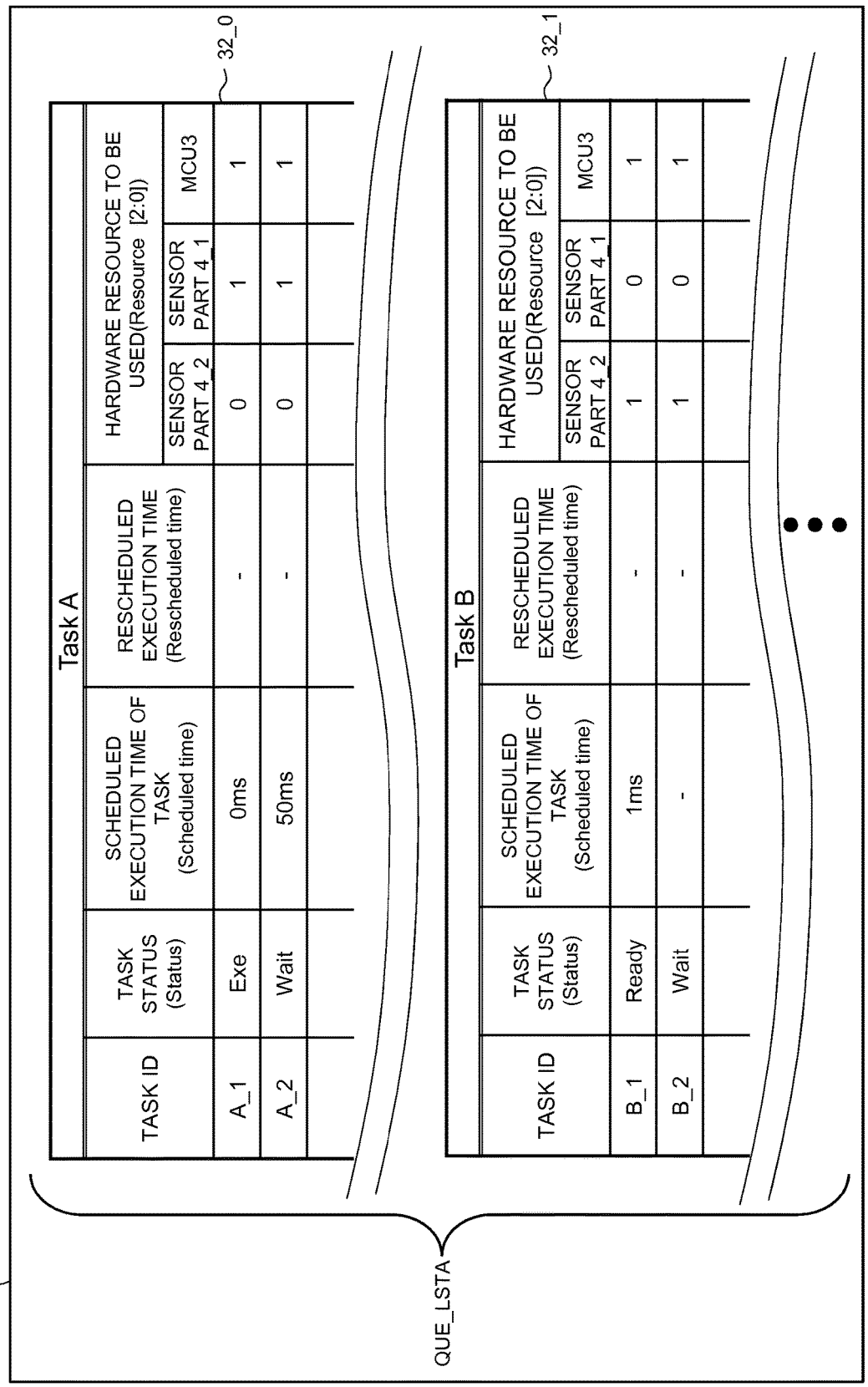
FIG. 13 is a diagram showing an example of a queue list according to the second embodiment.

FIG. 13 is a diagram showing an example of the queue list in connection with the second embodiment. In the queue list QUE_LSTA shown in the drawing, lists 32_0 and 32_1 are prepared for task types respectively as in the case of the queue list QUE_LST according to the first embodiment. The queue list QUE_LSTA includes, in each of the lists 32_0 and 32_1, an information piece showing "rescheduled execution time (Rescheduled time)" in addition to information pieces of the lists 31_0 and 31_1 according to the first embodiment. In case that an already scheduled execution time (Scheduled time) is changed, an information piece about the rescheduled execution time is written into the queue list.

FIG. 14 is a diagram showing an example of a flow of task scheduling and action mode decision according to the second embodiment. FIGS. 15A to 15D are each a diagram showing the way of updating the queue list in the data processing system according to the second embodiment. For instance, the queue list according to the second embodiment is updated in the order of FIGS. 15A, 15B, 15C and 15D according to the flow shown in FIG. 14.

The flow diagram of FIG. 14 is different from that of FIG. 8 in including the processes in the steps S201 to S203 instead of the process in the step S106. Now, it is noted that the same process steps as those in the flow diagram of the FIG. 8 are identified by the same reference numerals, and the detailed descriptions thereof are skipped here.

After having released the power-on reset or the like subsequent to the power-on, initial settings of task management information TMIA and hardware information HWI are performed on the memory parts 13 and 14 first. Then, the operation-control part 10 creates a queue list based on the task management information TMIA, and brings head tasks of tasks of all types in the queue list to the execution status "Ready" (S101), but brings the other tasks to "Wait" status. It is assumed here that the queue list as shown in FIG. 15A is created.

Next, the operation-control part 10 has, of tasks in "Ready" status, the most preferred task executed, and brings the task to the execution status "Exe" (S102). Then, the operation-control part 10 sets a scheduled execution time of a task of the same type as a task in "Exe" status in the queue list (S103). It is assumed here that the task A_1 in the queue list of FIG. 15A is brought to the execution status "Exe", and "50 ms" is set as the scheduled execution time of the task A_2 of the same type as the task A_1 in execution as in FIG. 15B.

Next, the operation-control part 10 makes a judgment on whether or not there is an additional task in "Ready" status in the queue list (S104). If it is judged that there is an additional tasks in "Ready" status, the operation-control part 10 selects the most preferred task from the tasks in "Ready" status, and sets the scheduled execution time of the selected task (S105). For instance, in the example shown in FIG. 15B, the time "1 ms" after the elapse of an execution time (1 ms) of the task A_1 from the execution-start time (0 ms) of the task A_1 in execution is set as the scheduled execution time of the task B_1 in "Ready" status. The subsequent processes after that are conducted according to the same procedure as that shown in the flow diagram of FIG. 8 (S107 to S112).

On the other hand, if it is judged that there is no additional task in "Ready" status in the step S104, the operation-control part 10 selects a task which is the earliest in scheduled execution time from tasks in "Wait" status (S201). Then, the operation-control part 10 makes a judgment on whether or not there is an additional task scheduled to be executed within a range of the grace time Tex from the scheduled execution-start time of the task selected in the step S201 (S202). In case that an additional task scheduled to be executed is scheduled within the range of the grace time Tex, the scheduled execution time of the task of "Wait" status selected in the step S201 is changed so as to make shorter a time interval between a task in "Wait" status selected in the step S201 and the additional task (S203). In case that there is more than one task in "Wait" status, the steps S202 and S203 are repeatedly executed, thereby making a readjustment so that the more than one task can be executed collectively as far as possible. In contrast, in case that there is no additional task scheduled to be executed within the range of the grace time Tex, or the change of the scheduled execution time has been completed in the step S202, the operation-control part 10 goes into the step S107. The action mode of each hardware resource is decided according to the same process procedure as that in the first embodiment (S107 to S112).

Now, the process involved in the change of the scheduled execution time of a task by the steps S201 to S203 will be described with reference to FIG. 15C concretely.

The procedure of changing the scheduled execution time of a task in the case of results of the scheduling of FIG. 15C is as follows. As shown in FIG. 15C, tasks in "Wait" status are a task A_2, a task B_2, and a task A_3; the scheduled execution-start times of the tasks are "50 ms", "56 ms" and "undecided". In the step S201, the operation-processing part 10 selects, of tasks A_2, A_3, B_2 in "Wait" status, "task A_2" which is the earliest in scheduled execution time. Next, the operation-processing part 10 makes a judgment on whether or not there is an additional task scheduled to be executed within a range of the grace time Tex from the scheduled execution-start time of the selected task A_2 in the step 202. Specifically, the operation-processing part 10 makes a judgment on whether or not there is an additional task until the time (62.5 ms) determined by adding the grace time Tex (Tc/4=12.5 ms) of the task A to the scheduled execution time (50 ms) of the selected task A_2. In the case of FIG. 15C, the execution of the task B_2 (scheduled execution time 56 ms) is scheduled in a period until the time 62.5 ms and therefore, the operation-control part 10 judges that an additional task is present within the range of the grace time. Next, the operation-processing part 10 changes the scheduled execution time of the task A_2 so as to make shorter the time interval between the task A_2 and the task B_2. Specifically, the scheduled execution time of the task A_2 is changed so that the task A_2 and the task B_2 are executed successively. For instance, as shown in FIG. 15C, the scheduled execution time of the task B_2 is "56 ms", and the execution time of the task A_2 is "1 ms". Therefore, the scheduled execution time of the task A_2 is changed from "50 ms" to "55 ms" so as to successively execute the task A_2 and the task B_2. Thus, the time interval between the scheduled termination time of the task B_1 in execution and the scheduled execution time of the task A_2 becomes longer.

Figure 16:
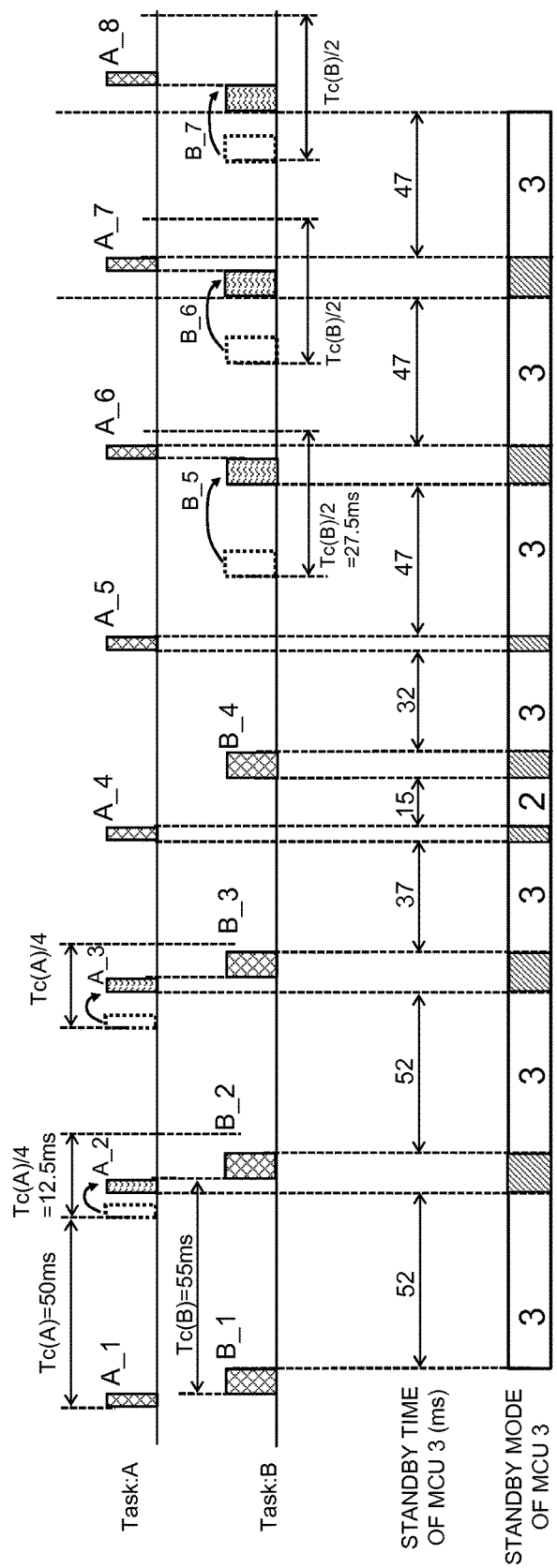
FIG. 16 is a diagram showing a result of task scheduling, and examples of transition states in the action mode of MCU 3 in the data processing system according to the second embodiment.

FIG. 16 shows a result of task scheduling, and examples of transition states in the action mode of MCU 3 according to the second embodiment. As described above, the execution cycle Tc of the task A is 50 ms, the execution time Ton is 1 ms, the grace time Tex is Tc/4 (=12.5 ms), the execution cycle Tc of the task B is 55 ms, and the execution time Ton is 1 ms, and the grace time Tex is Tc/2 (=27.5 ms). Further, MCU 3 is used for both of the task A and the task B as described above. It is noted that in the drawing, "1" represents a standby mode STB1, "2" represents a standby mode STB2, "3" represents a standby mode STB3, and a cross-hatched portion represents a normal action mode (non-standby mode).

As shown in FIG. 16, the change of the scheduling by the control part 1 varies the scheduled execution time of the task A_2 from "50 ms" to "55 ms" while the task B_1 is executed. Thus, the standby time of MCU 3 from the completion of the task B_1 until the execution of the task A_2 is increased from 47 ms (see FIG. 11) to 52 ms. That is, a period during which the power source to MCU 3 remains cut off (i.e. a period during which MCU works in the standby mode STB3) is made longer. Likewise, the scheduled execution time of the task A_3 is changed, whereby the standby time of MCU 3 from the completion of the task B_2 until the execution of the task A_3 is increased from "42 ms" (see FIG. 11) to "52 ms" and consequently, a period during which the power source to MCU 3 remains cut off is made longer. Further, in regard to the task A_5 or subsequent tasks, the scheduled execution time of the task B_5 is changed based on the same theory, whereby the standby time from the completion of the task A_5 until the execution of the task B_5 is increased from "20 ms" (see FIG. 11) to "47 ms" and consequently, a period during which the power source to MCU 3 remains cut off is made longer.

As described above, with the data processing system according to the second embodiment, correction is made based on a result of the scheduling so that the time interval between task executions is made shorter and therefore, the standby time of each hardware resource can be made longer. Consequently, a period during which each hardware resource can be kept on standby is made longer, and the power consumption of the data processing system can be reduced further. Especially, in the case of a data processing system including a device (such as a microcomputer) having a standby mode during which a power source remains cut off, and a standby mode during which the power source is not cut off as in this embodiment, the probability of transition to the standby mode during which the power source remains cut off becomes higher is raised by making the standby time longer. Therefore, it is expected that the electric power can be further reduced.

<<Third Embodiment>>

A data processing system according to the third embodiment has the function of changing a circuit current of a regulator circuit of the power-source part 2 according to the standby mode in addition to the functions of the data processing system according to the first embodiment.

Figure 17:
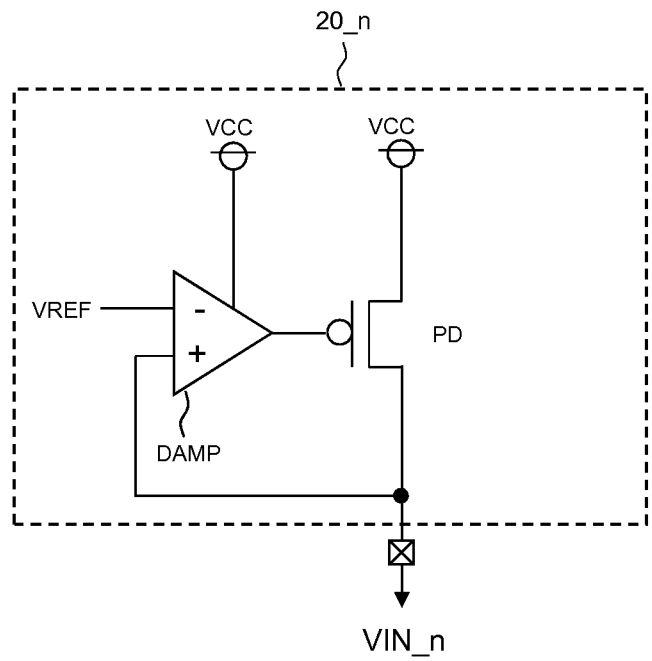
FIG. 17 is a diagram showing, by example, the inside configuration of the regulator circuit 20_n in the data processing system according to the third embodiment.

FIG. 17 is a diagram showing, by example, the inside configuration of the regulator circuit 20_n in the data processing system according to the third embodiment. As shown in the drawing, the regulator circuit 20_n for supplying a power source to each hardware resource includes: a differential amplifier DAMP; and a MOS transistor PD serving as an output driver. The differential amplifier DAMP controls the gate voltage of the MOS transistor PD so that the output voltage VIN_n is fixed and thus, a stable source voltage is supplied to each hardware resource.

Figure 18:
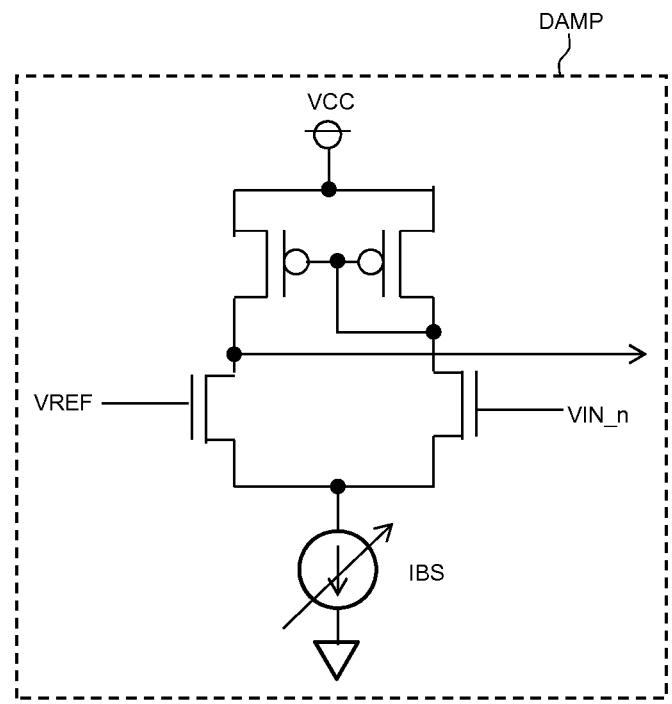
FIG. 18 is a diagram showing, by example, the circuit configuration of a differential amplification stage of a differential amplifier DAMP in a regulator circuit.

FIG. 18 is a diagram showing, by example, the circuit configuration of a differential amplification stage of the differential amplifier DAMP in the regulator circuit. As shown in the drawing, the data processing system according to the third embodiment is arranged so that a bias current (e.g. tail current) IBS of the differential amplification stage of the differential amplifier DAMP can be changed according to the action mode of a hardware resource to supply a power source to. For instance, in the case of the regulator circuit 20_n for supplying a source voltage to MCU 3, a bias current IBS when MCU 3 works in a standby mode is made smaller than that when MCU 3 works in a normal action mode. For instance, in case that MCU 3 is caused to transition to the first/second standby mode STB1/STB2 (with the power source remaining supplied thereto), the bias current IBS is made smaller than that in the normal action mode. The source capacity required in the standby modes STB1 and STB2 is not higher in current than a source capacity required in the normal action mode. On this account, even if the responsiveness of the regulator circuit is lowered by reducing the bias current of the differential amplifier DAMP, the circuit can work well. On the other hand, in case that MCU 3 is caused to transition to the standby mode STB3 (with the power source cut off), the bias current IBS is made "0 (zero)" to cut off a circuit current of the differential amplifier DAMP of the regulator circuit 20_n. The regulator circuits 20_1 and 20_2 for supplying a power source to the sensor parts 4_1 and 4_2 are arranged likewise, so the bias current IBS is changed according to the action mode of the sensor part 4_1.

As described above, changing the circuit current of the regulator circuit of the power-source part 2 according to the action mode of each hardware resource, a current consumed by the data processing system can be further reduced while ensuring the responsiveness required of the regulator circuit.

<<Fourth Embodiment>>

A data processing system according to the fourth embodiment has the function of changing the break-even time BET according to a temperature in addition to the functions of the data processing system according to the first embodiment. Specifically, the control part 1 has a plurality of pieces of hardware information HWI, selects any hardware information piece based on temperature information input from the outside, and uses the break-even time of the selected hardware information piece to decide the action mode of each hardware resource.

Figure 19:
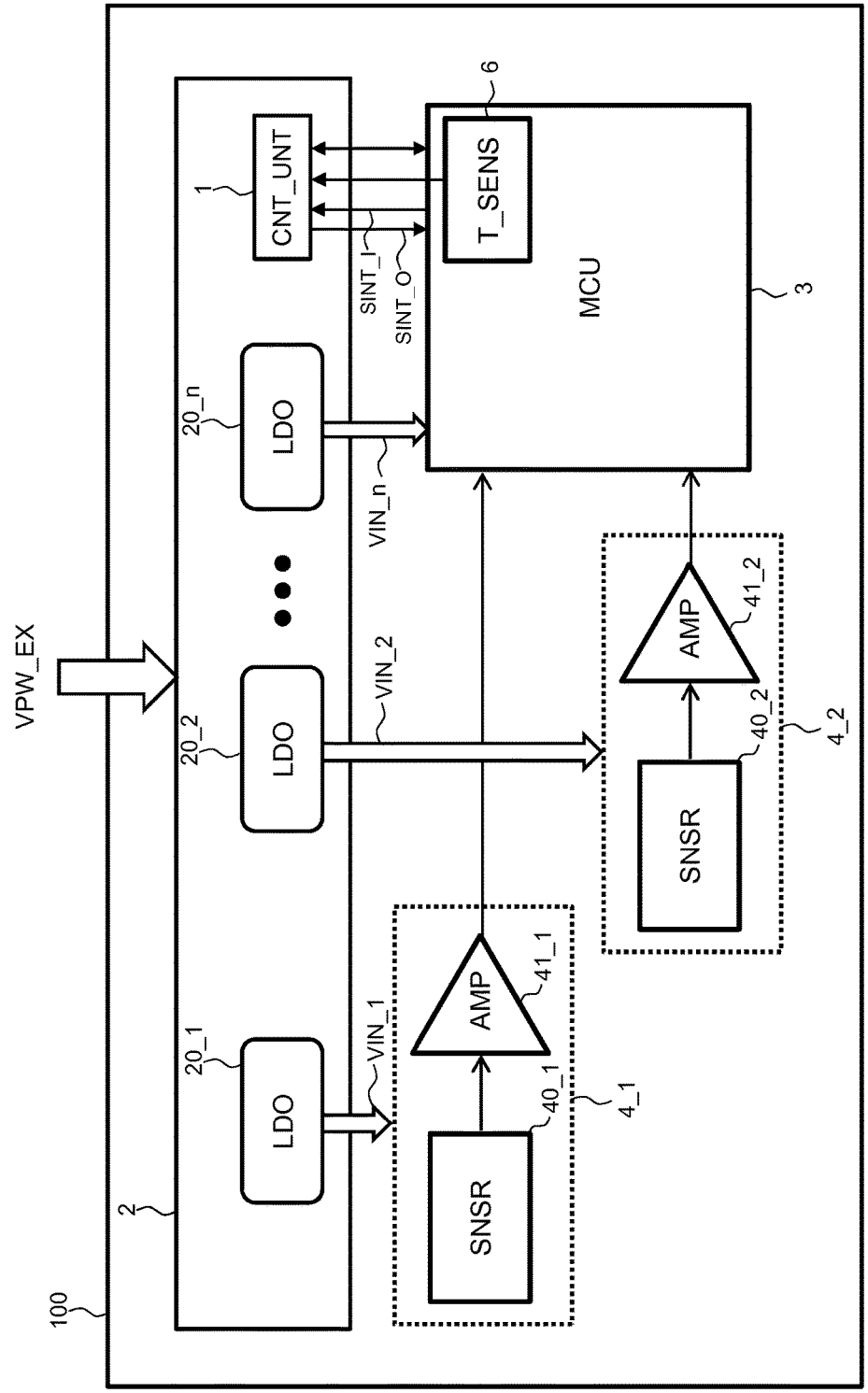
FIG. 19 is a diagram showing, by example, a data processing system according to the fourth embodiment.

FIG. 19 shows, by example, the data processing system according to the fourth embodiment. The data processing system shown in the drawing has a temperature sensor 6 inside MCU 3. The information of a temperature detected by the temperature sensor 6 is input to the control part 1. In this embodiment, the temperature sensor 6 provided inside MCU 3 is shown, by example, although where to provide the temperature sensor 6 is not particularly limited as long as it is located inside the the data processing system 100.

Figure 20:
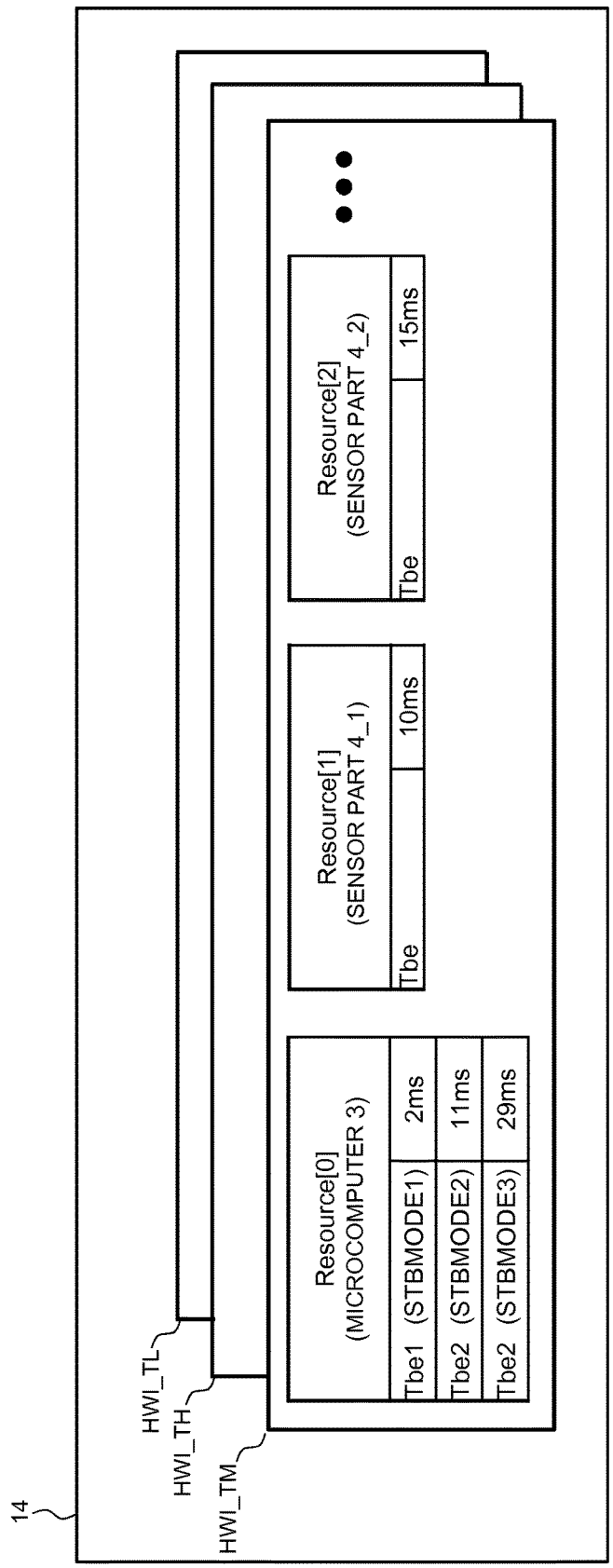
FIG. 20 is a diagram showing, by example, groups of hardware information according to the fourth embodiment.

FIG. 20 is a diagram showing, by example, groups of hardware information according to the fourth embodiment. As shown in the drawing, the groups of hardware information HWI_TM, HWI_TH, HWI_TL are stored in the memory part 14 of the control part 1. The groups of hardware information are provided corresponding to temperatures. The following groups of hardware information are stored in the memory part 14 corresponding to temperature ranges respectively: e.g. the group of hardware information HWI_TL corresponding to a temperature range of −40 to 0 degree; the group of hardware information HWI_TM corresponding to a temperature range of 0 to 40 degrees; and the group of hardware information HWI_TH corresponding to a temperature range of 40 to 80 degrees. For instance, the control part 1 regularly receives temperature information taken by the temperature sensor 5 and selects any one group from the groups of hardware information stored in the memory part 14 based on temperature information concerned. In case that a result of sensing by the temperature sensor 5 is e.g. "25 degrees", the control part 1 utilizes information on the break-even time of the group of hardware information HWI_TM corresponding to the temperature range of 0 to 40 degrees, and makes a comparison with the forementioned standby time Tw, thereby deciding the action mode of each hardware resource. The other details of the control are as described for the embodiment.

As already described, it has been generally known that the break-even time BET depending on the standby mode varies depending of the temperature. Therefore, as the data processing system according to the fourth embodiment is arranged, the following are made possible by changing the break-even time according to the temperature: to select an optimum standby mode more properly; and to effectively reduce the power consumption by a data processing system regardless of the temperature.

<<Fifth Embodiment>>

A data processing system according to the fifth embodiment has the function of changing a task execution cycle based on a result of task execution in addition to the functions of the data processing system according to the first embodiment.

Now, a case where the data processing system 100 executes "Task A" which is "a process of taking a result of detection by the sensor part 4_1 in MCU 3" at intervals of 50 ms will be considered. In this case, MCU 3 receives a result of detection by the sensor part 4_1 at intervals of 50 ms. MCU 3 compares the result of detection by the sensor part 4_1 received in execution of the task A_n with a result of detection by the sensor part 4_1 in connection with a task (e.g. the preceding task A_n−1) executed prior to the task A_n to calculate a degree of change of the result of detection by the sensor part 4_1. With a change in result of detection by the sensor part 4_1 below a predetermined threshold, MCU 3 updates the value of the execution cycle Tc of the task A to make the execution cycle of the task A longer. Specifically, MCU 3 accesses the memory part 13 of the control part 1 to change the execution cycle Tc of the task A in task management information TMI stored therein to a value (e.g. 60 ms) larger than an initial value of "50 ms".

According to the embodiment like this, an execution schedule of the task is improved to make the task execution cycle longer in case that the change in results (data) obtained by regularly executing a task is not very large. Thus, the standby time of each of hardware resources (MCU 3 and the sensor part 4_1 in the above embodiment) used for the task can be made longer.

In the data processing system according to the fifth embodiment, the standby time of each hardware resource can be made longer by improving task execution cycle, as described above. Therefore, it can be expected to enable a further reduction in electric power.

While the invention made by the inventor has been concretely described above based on the embodiments thereof, the invention is not limited to the embodiments. It is obvious that various changes and modifications may be made without departing from the subject matter thereof.

For instance, the embodiments in which the configurations and functions of the data processing systems according to the third to fifth embodiments are applied to the data processing system according to the first embodiment have been shown, while the configurations and functions may be applied to the data processing system according to the second embodiment.

Further, the embodiment in which the data processing system 100 is a sensor system has been shown, while the invention is not limited to this embodiment. It can be applied to other systems, e.g. a battery-driven portable terminal device.

In addition, the place to place the control part 1 in is not limited to the inside of the power source IC, as described above. The control part 1 is required to remain activated even with other hardware resources on standby. Therefore, it is preferable from the viewpoint of system specifications to form the control part 1 inside a power source IC or a real-time clock (RTC) IC which has so little opportunity to be subjected to cutoff of power source, or the like, while the control part 1 may be provided inside MCU 3, or it may be formed into a single IC by itself.

While MCU 3 is shown, by example, as a device having a plurality of standby modes (STB1, STB2, STB3), it is not so limited. MCU 3 may be DSP, a memory module, an analog IC or the like as long as it is a device having a plurality of standby modes.

While an embodiment in which the regulator circuits 20_1 to 20_n in the power-source part 2 are composed of LDOs has been shown, they are not limited to LDOs. The regulator circuits are not limited to LDOs, and they may be other power supply circuits such as switching regulators or charge-pump-power sources as long as they are arranged to be able to perform the control of the change of the value of a voltage to supply to a hardware resource, the cutoff of the source voltage supplied to each hardware resource, and the like.

What is claimed is:

1. A data processing system comprising:
   a plurality of hardware resources;
   a power source for supplying power to each of the plurality of hardware resources; and
   a processor configured to:
      control execution of a task achieved by using, of the plurality of hardware resources, predetermined ones, and a working status of each hardware resource,
      control supply of a power from the power source to each of the plurality of hardware resources,
      perform scheduling of a scheduled execution time of the task based on information for determining a timing of executing the task,
      calculate a standby time until one of the hardware resources is used for the task next time based on a result of the scheduling,
      compare the calculated standby time with a break-even time depending on the standby mode of the one of the hardware resources, and
      decide, for each hardware resource, whether or not to cause the one of the hardware resources to transition to the standby mode.

2. The data processing system according to claim 1, wherein the information for determining a timing of executing the task includes: a piece of information showing a cycle to execute the task with; a piece of information showing an execution time of the task; and a piece of information designating the hardware resource used for executing the task, the processor is further configured to:
perform scheduling of the scheduled execution time of the task based on the cycle to execute the task with, and calculate, based on a difference between an execution-completion time of a predetermined task which uses a predetermined hardware resource designated by the resource information and a scheduled execution time of a task scheduled to be executed subsequently to the predetermined task while using the predetermined hardware resource, the standby time of the predetermined hardware resource, and the execution-completion time is calculated by adding up an execution-start time of the task using the predetermined hardware resource, and an execution time of the task.

3. The data processing system according to claim 2, wherein the plurality of hardware resources comprises a device having a first standby mode in which supply of a power source is not cut off, and a second standby mode in which supply of the power source is cut off, the break-even time of the device includes a first break-even time depending on the first standby mode, and a second break-even time depending on the second standby mode, and the second break-even time is made larger than the first break-even time, and when causing the device to transition to a standby mode, the processor is configured to cause the device to transition to the first standby mode in case that the calculated standby time of the device is larger than the first break-even time, and smaller than the second break-even time, and cause the device to transition to the second standby mode in case that the calculated standby time of the device is larger than the second break-even time.

4. The data processing system according to claim 3, wherein the device is a microcontroller.

5. The data processing system according to claim 3, wherein the processor is configured to change a scheduled execution time of a desired task within a predetermined time range so as to make shorter a time interval between a scheduled execution-start time of the desired task subjected to scheduling, and a scheduled execution-start time of the task scheduled to be executed subsequently.

6. The data processing system according to claim 5, wherein the information for determining a timing of executing the task further includes: a piece of information on a grace time showing a time which enables deviation from a cycle to execute the task with, and the processor is configured to change a scheduled execution time of the desired task so that the task scheduled to be executed subsequently is executed subsequently to the desired task on condition that execution of the task scheduled to be executed subsequently is scheduled within the grace time from a scheduled execution-start time of the desired task subjected to scheduling.

7. The data processing system according to claim 3, wherein a plurality of the break-even times each depending on the standby mode are set corresponding to pieces of temperature information, and the processor configured to select any one of a number of the break-even times based on input temperature information, and uses the selected break-even time to decide whether or not to cause the hardware resource to transition to a standby mode.

8. The data processing system according to claim 3, wherein the power source has a plurality of regulator circuits for each supplying a power source voltage to corresponding one of the plurality of hardware resources, and when causing each hardware resource to transition to a standby mode, the processor configured to perform control to make smaller a circuit current of the regulator circuit corresponding to the hardware resource.

9. The data processing system according to claim 8, wherein when causing the device to transition to the second standby mode, the processor is configured to perform control to cut off an operation current of the regulator circuit corresponding to the device, and when causing the device to transition to the first standby mode, the processor is configured to perform control to make an operation current of the regulator circuit corresponding to the device smaller than usual.

10. The data processing system according to claim 4, wherein the task includes a first task which requires the microcontroller to periodically receive data from outside, the microcontroller calculates an amount of change of data received with a desired timing owing to execution of the first task from data received with a timing prior thereto, and the microcontroller updates the information for determining a timing of executing the task to make a first task execution cycle longer on condition that the calculated amount of change does not exceed a predetermined threshold.

* * * * *